D. FITZPATRICK.
THREAD GRINDER.
APPLICATION FILED JUNE 22, 1918.
1,340,031.
Patented May 11, 1920.
15 SHEETS—SHEET 1.
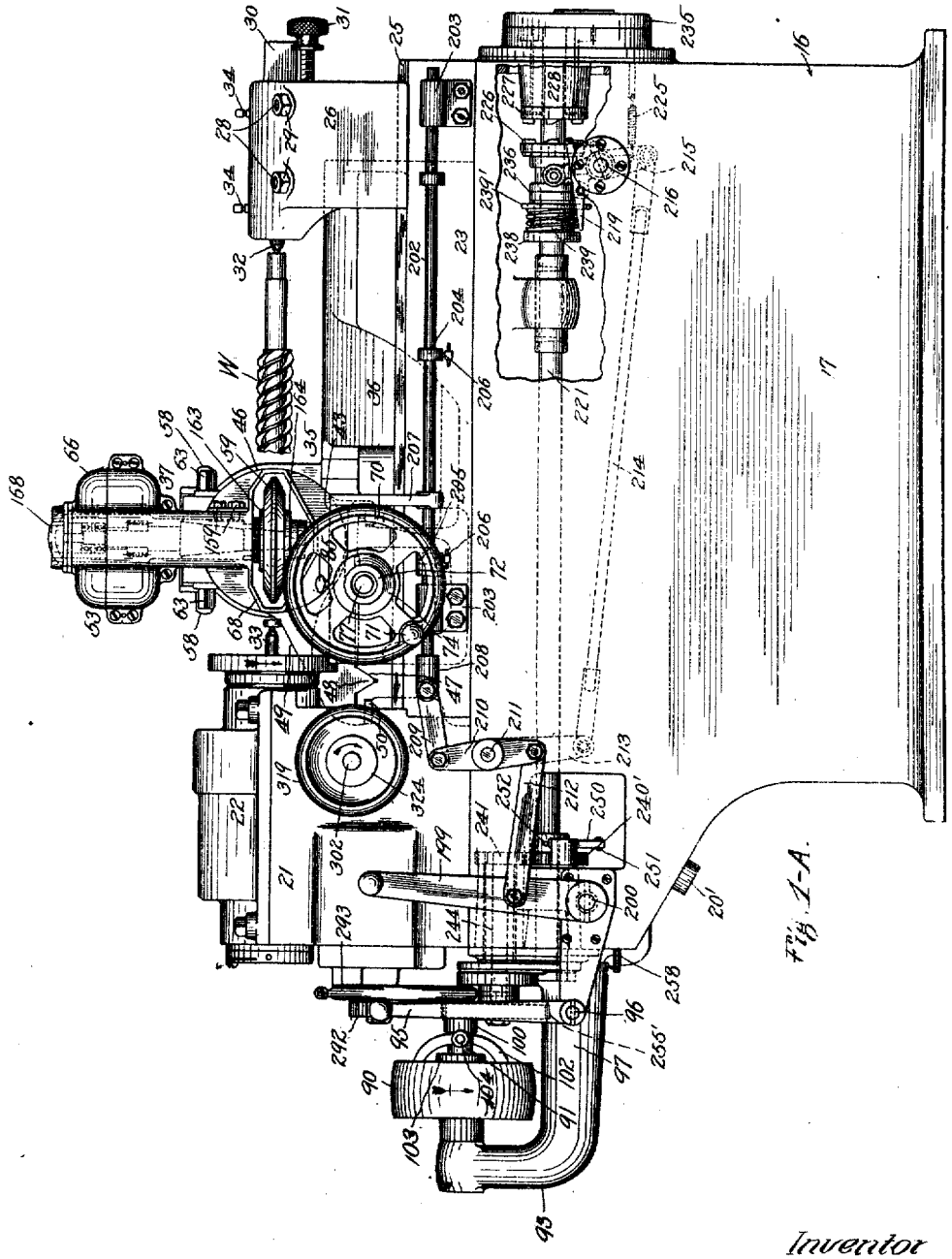
Fig. 1-A.
Inventor
David Fitzpatrick
by
his attorneys

D. FITZPATRICK.
THREAD GRINDER.
APPLICATION FILED JUNE 22, 1918.
1,340,031. Patented May 11, 1920.
15 SHEETS—SHEET 2.
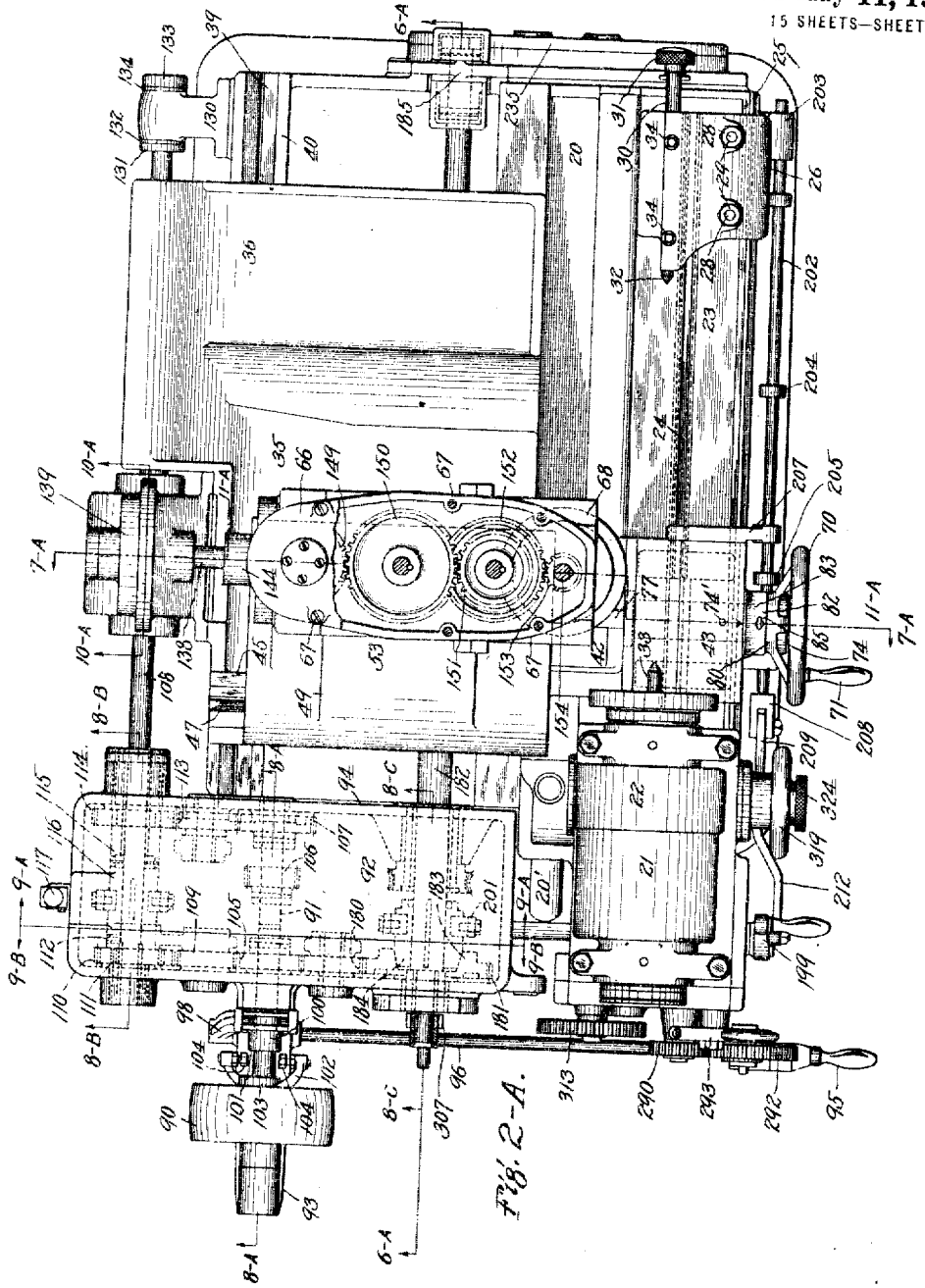
Fig. 2-A.
Inventor
David Fitzpatrick
by Hillary C. Messimer
his attorneys

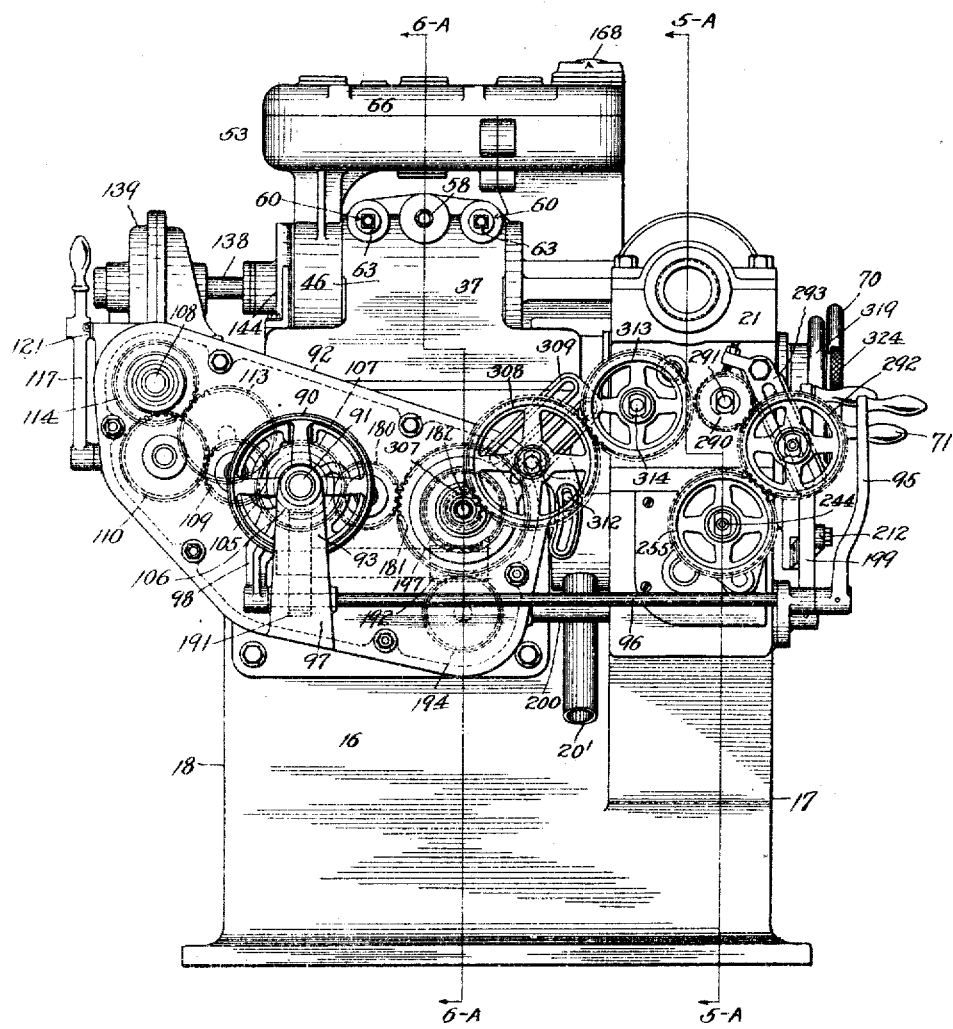
Fig. 3-A.

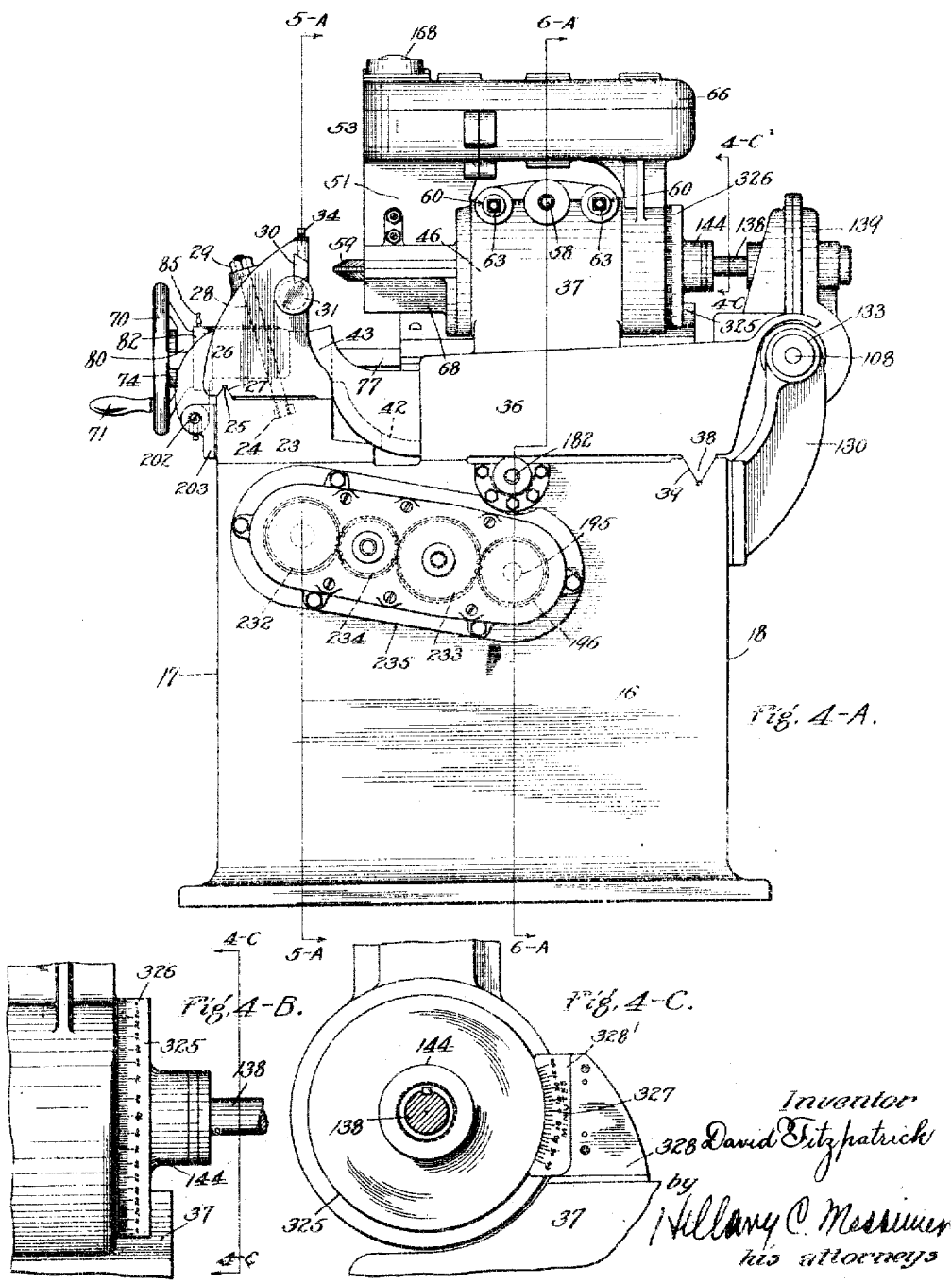

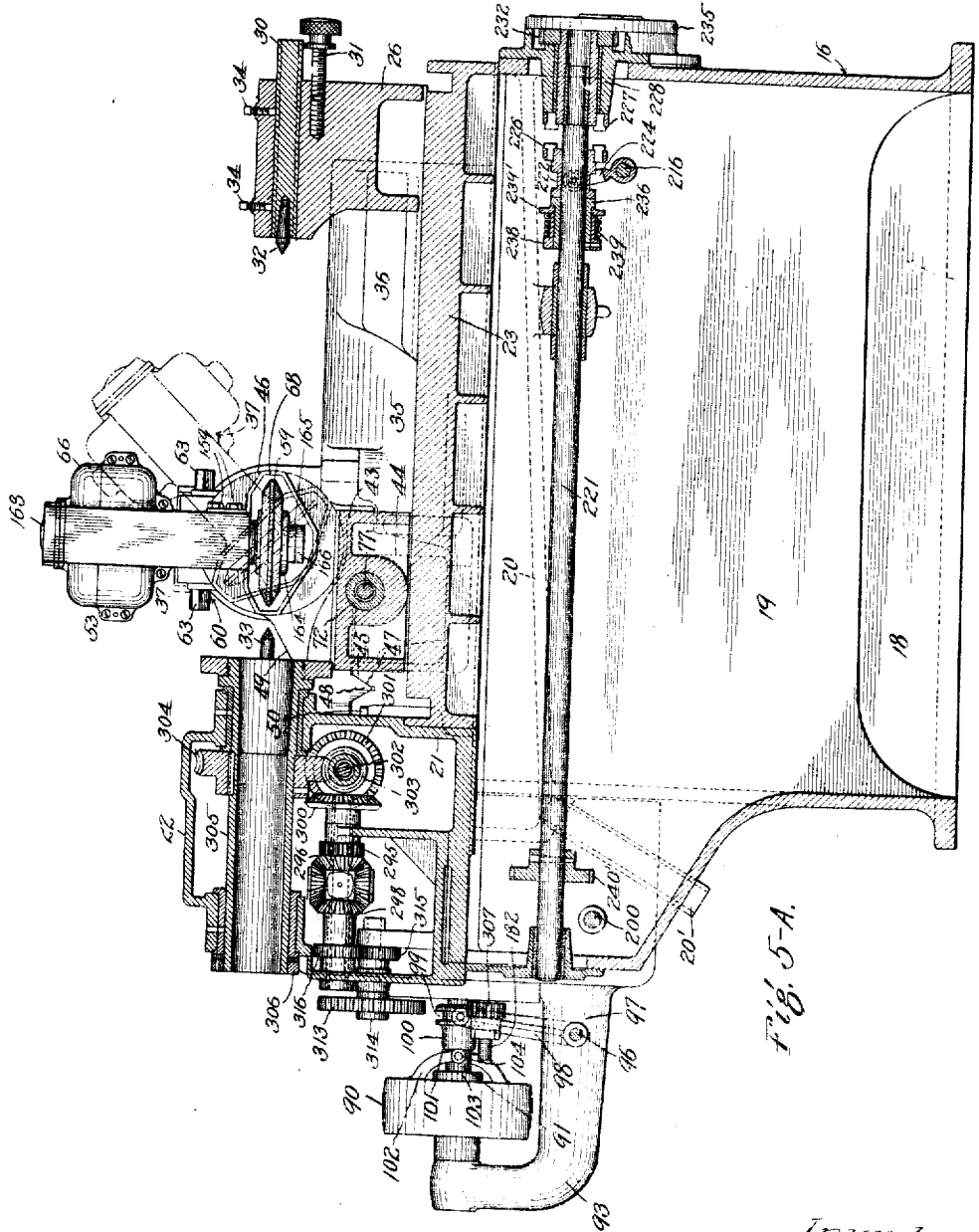

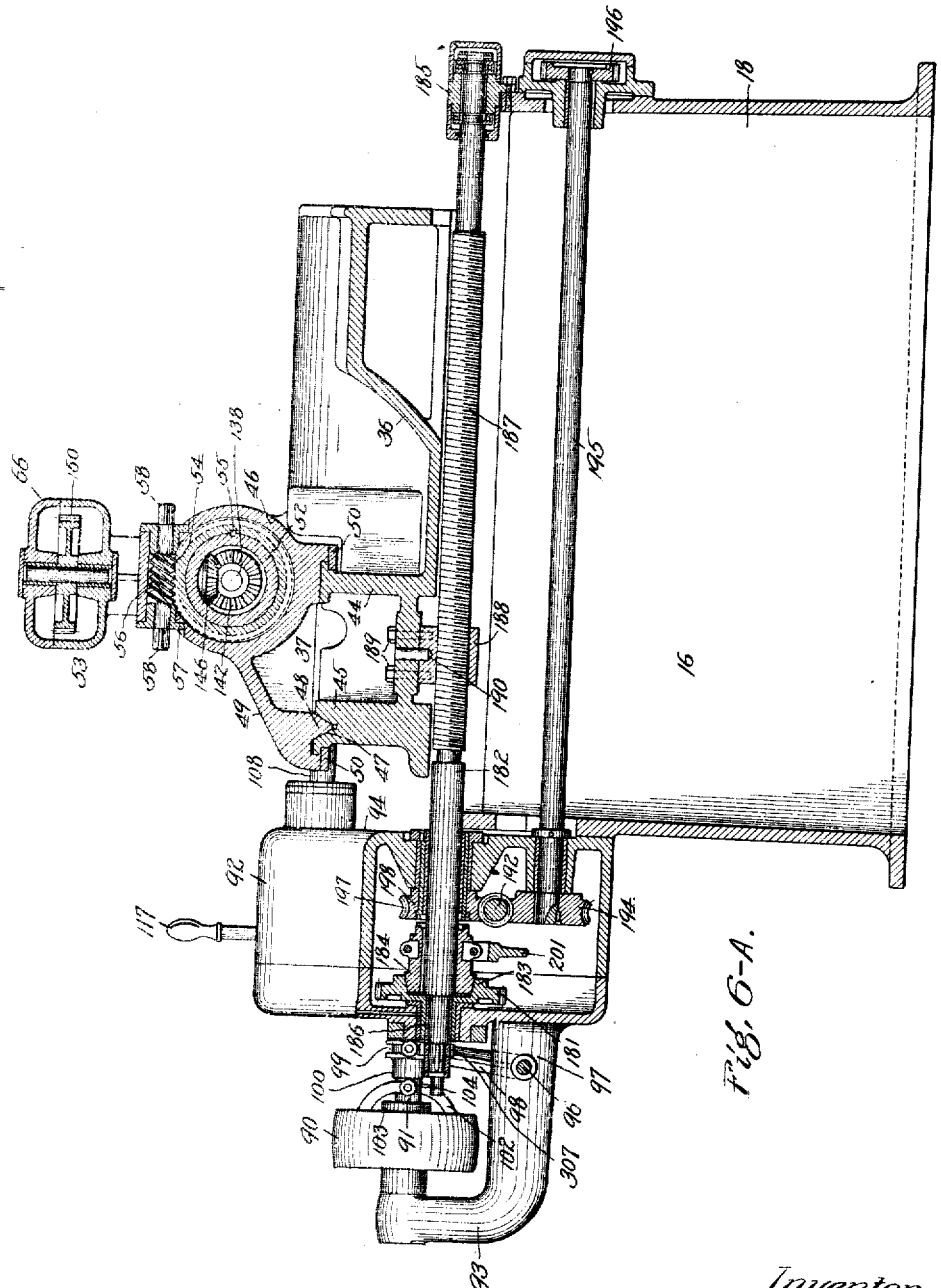

D. FITZPATRICK.
THREAD GRINDER.
APPLICATION FILED JUNE 22, 1918.
1,340,031.
Patented May 11, 1920.
15 SHEETS—SHEET 7.
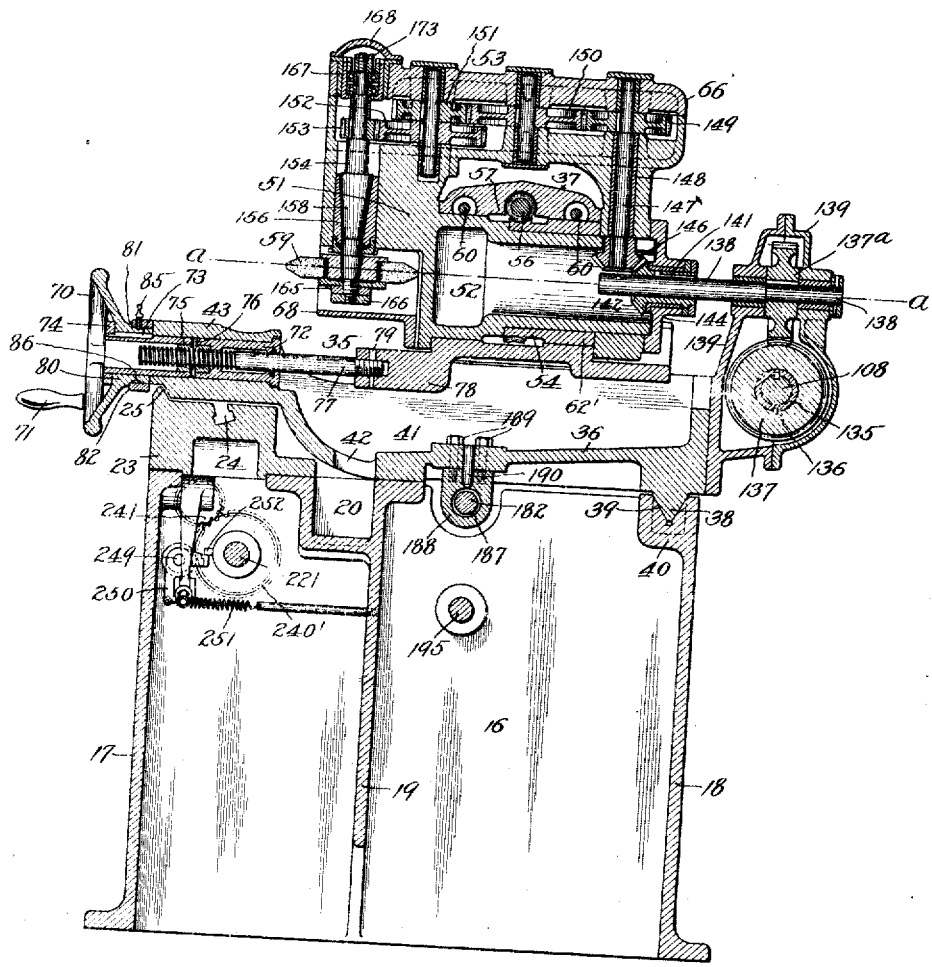
Fig. 7-A D. FITZPATRICK.
THREAD GRINDER.
APPLICATION FILED JUNE 22, 1918.
1,340,031.
Patented May 11, 1920.
15 SHEETS—SHEET 8.
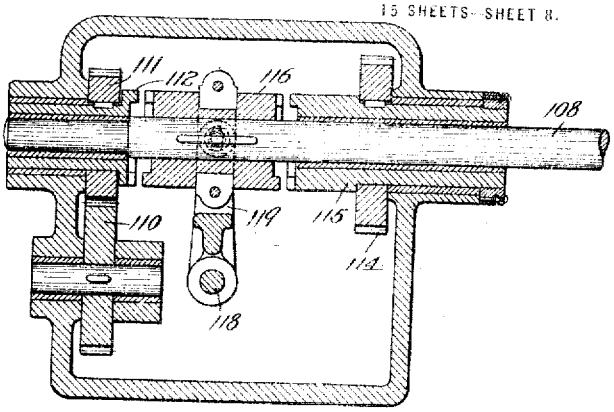
Fig. 8-B.
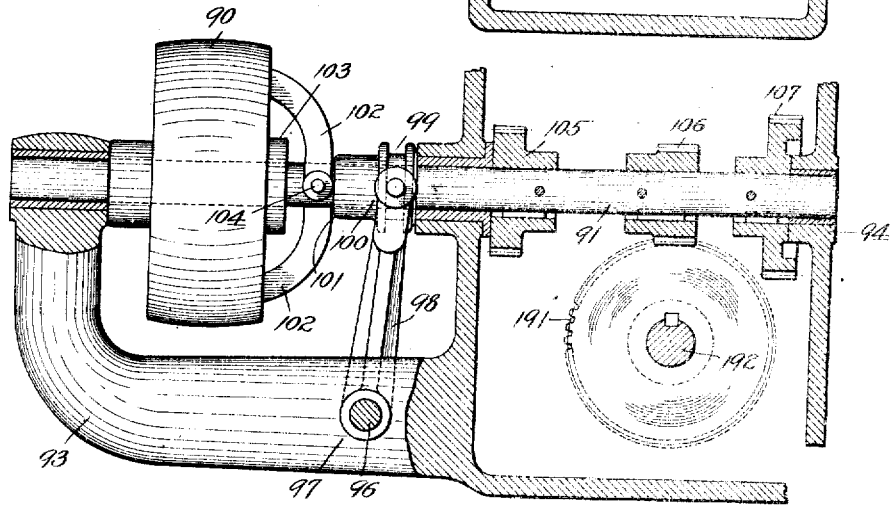
Fig. 8-A.
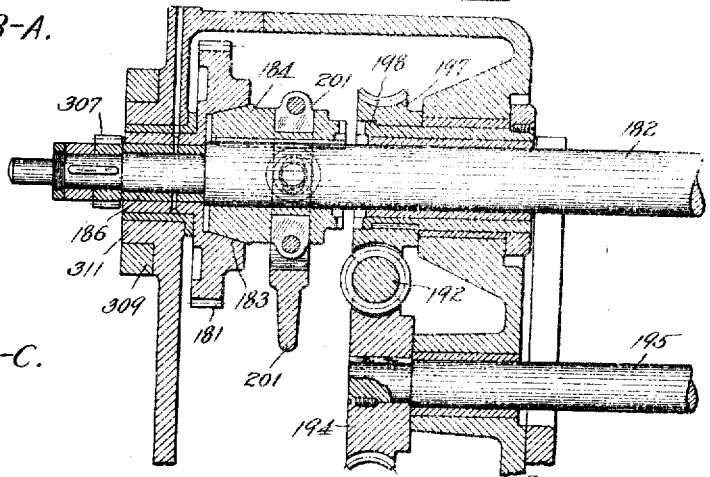
Fig. 8-C.
Inventor
David Fitzpatrick
by Hillary C. Messimer
his attorneys

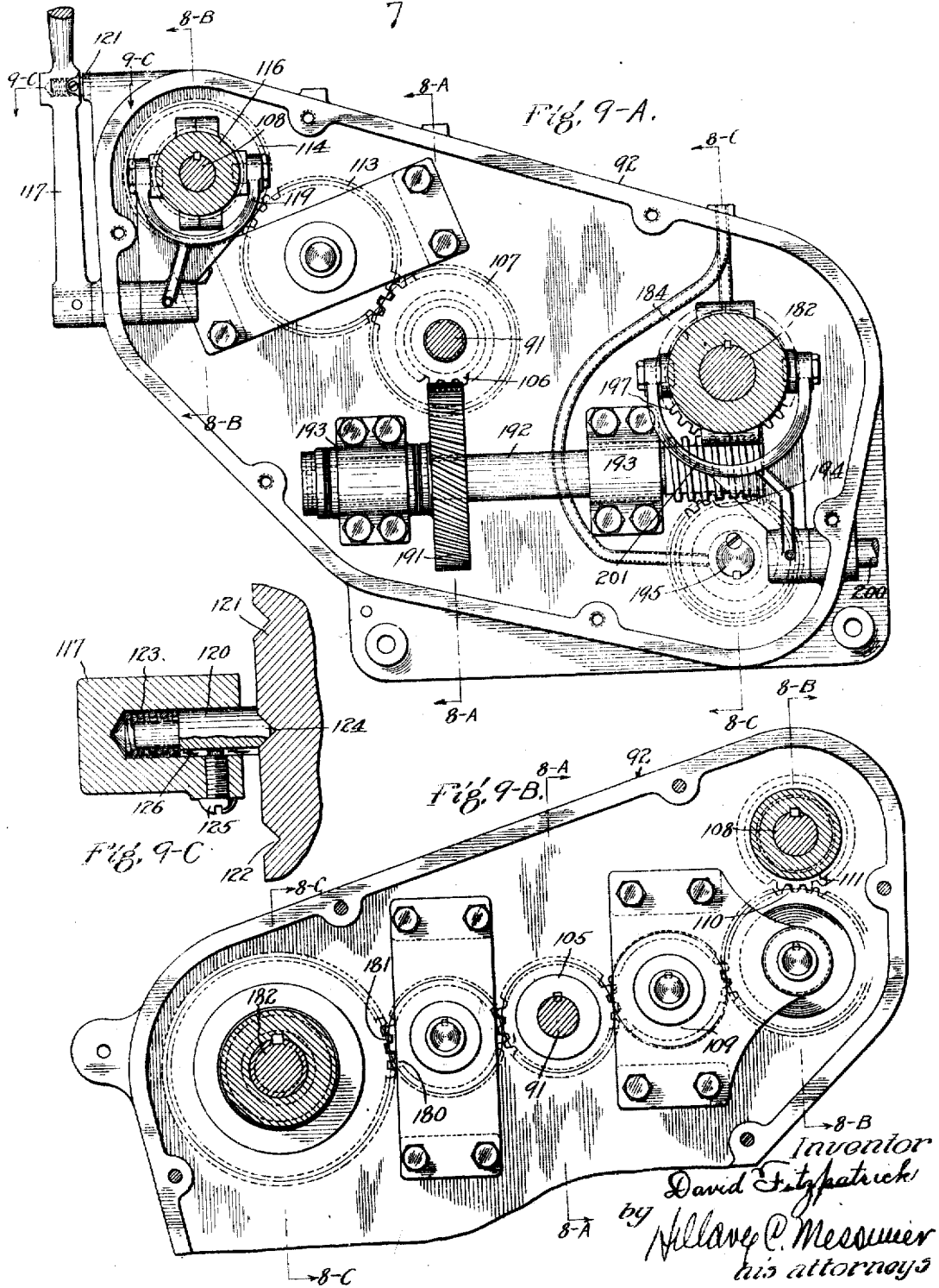

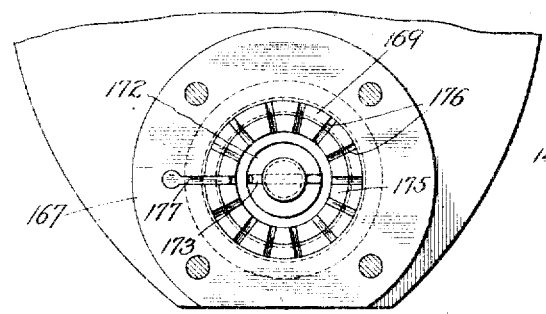
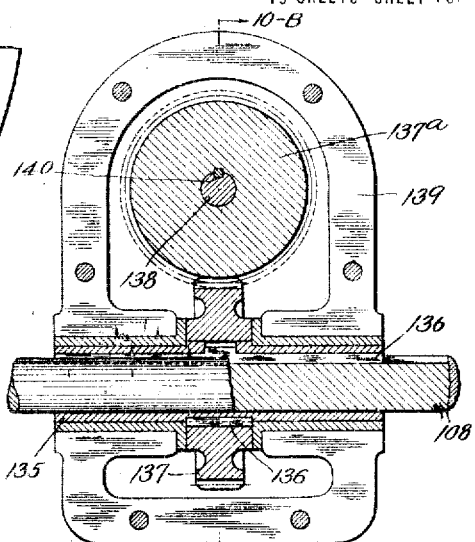
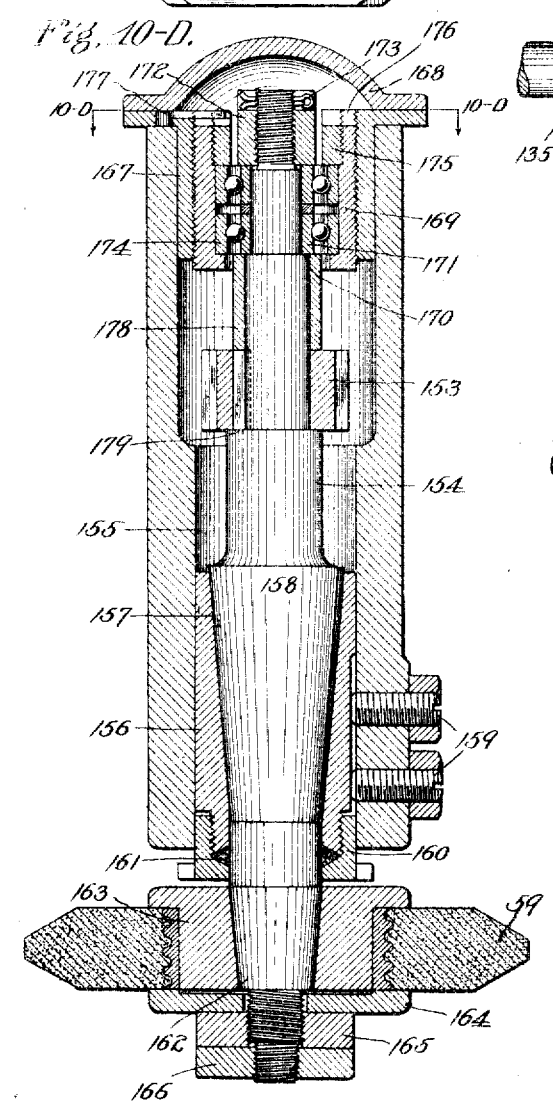
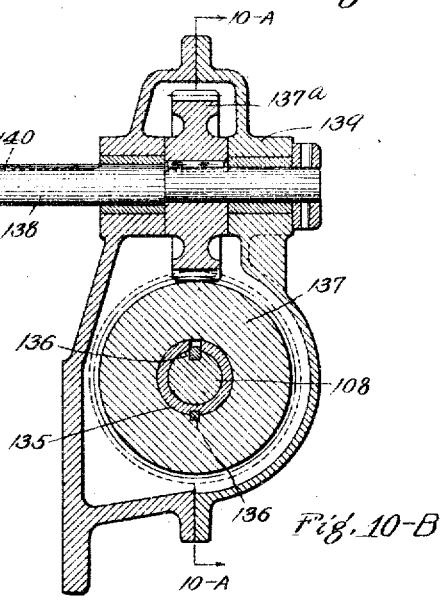

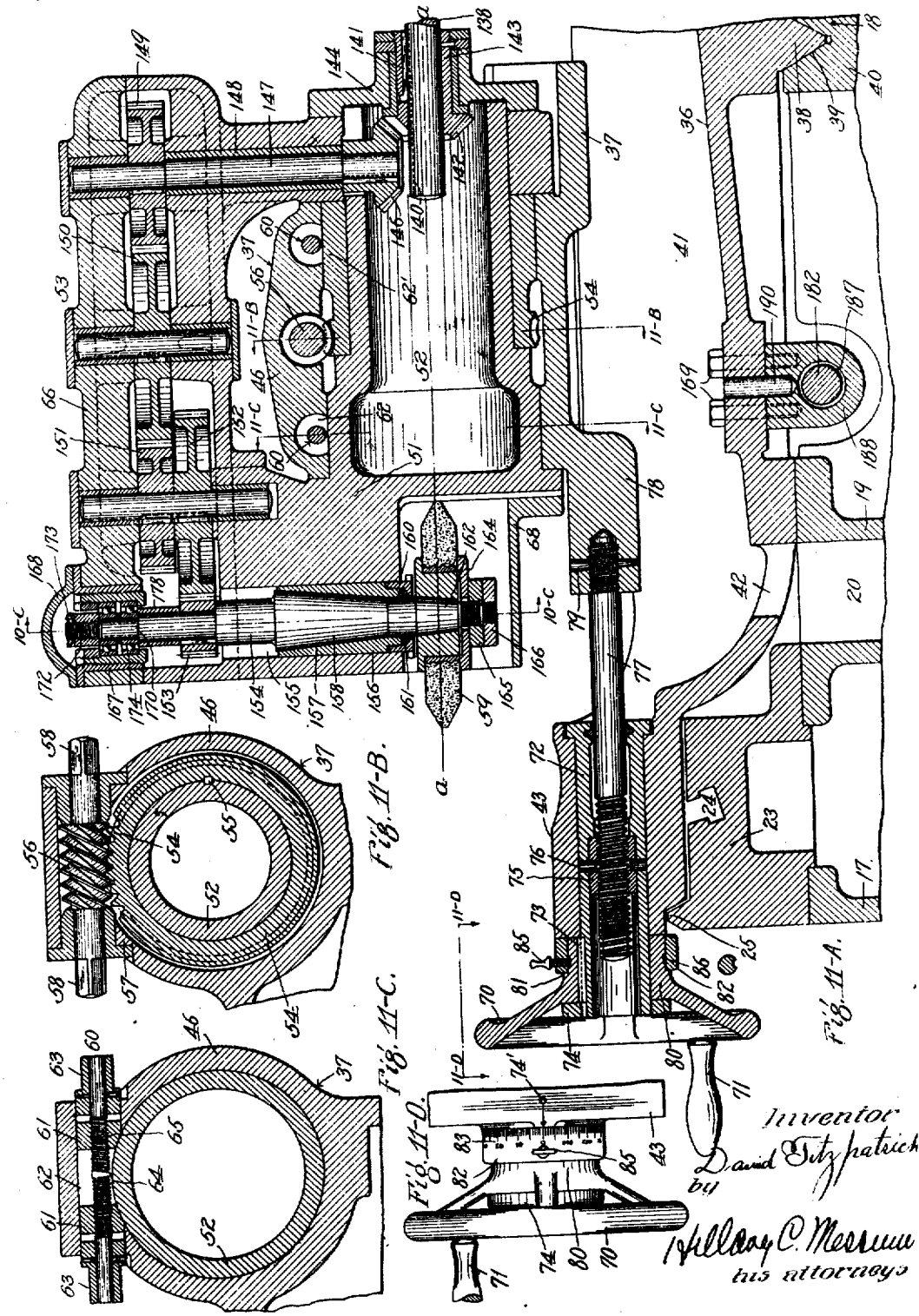

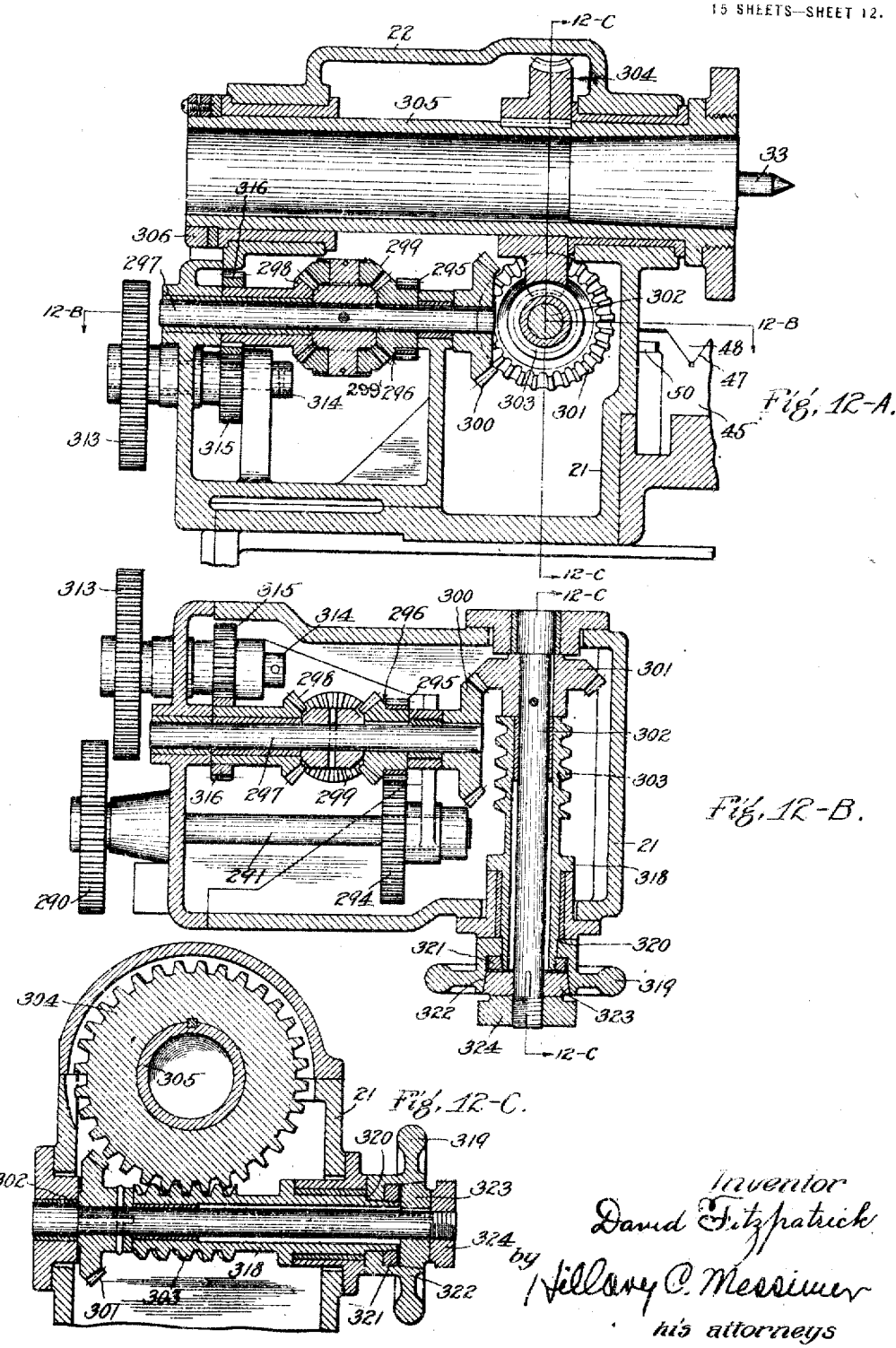

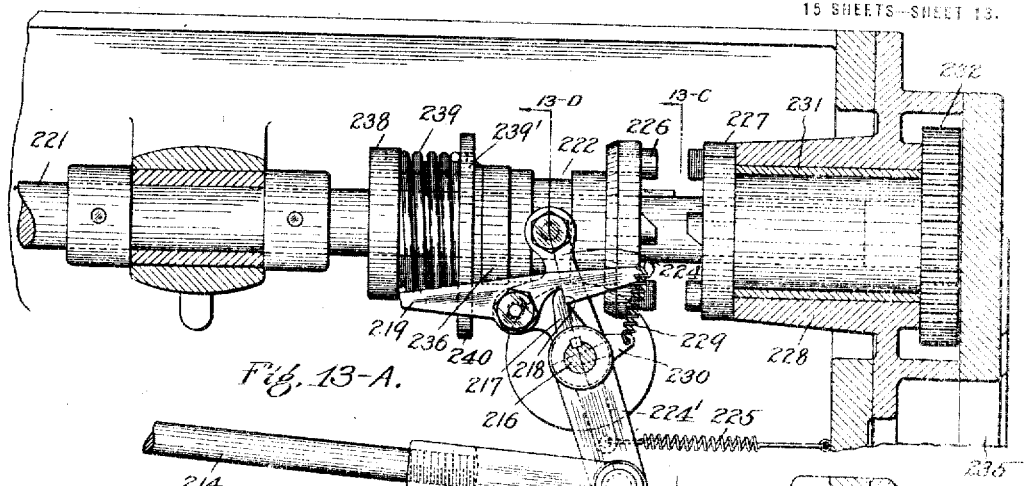
Fig. 13-A.
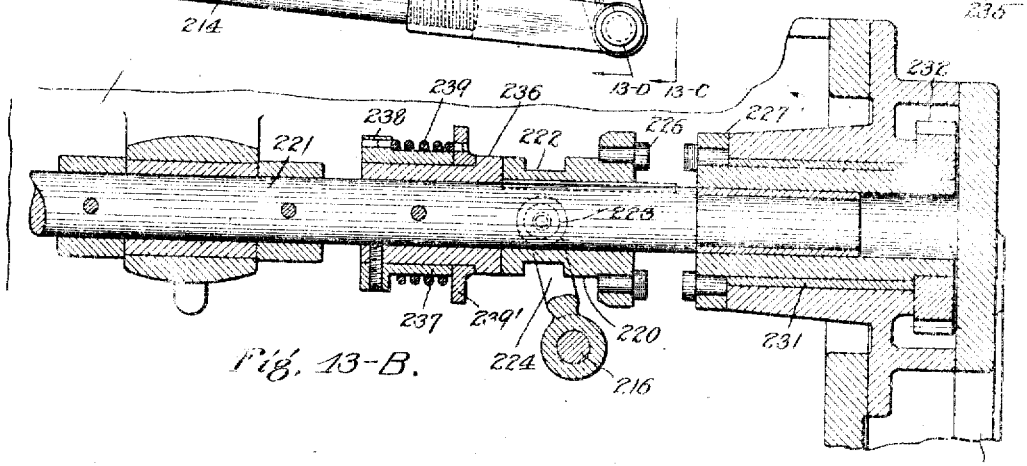
Fig. 13-B.
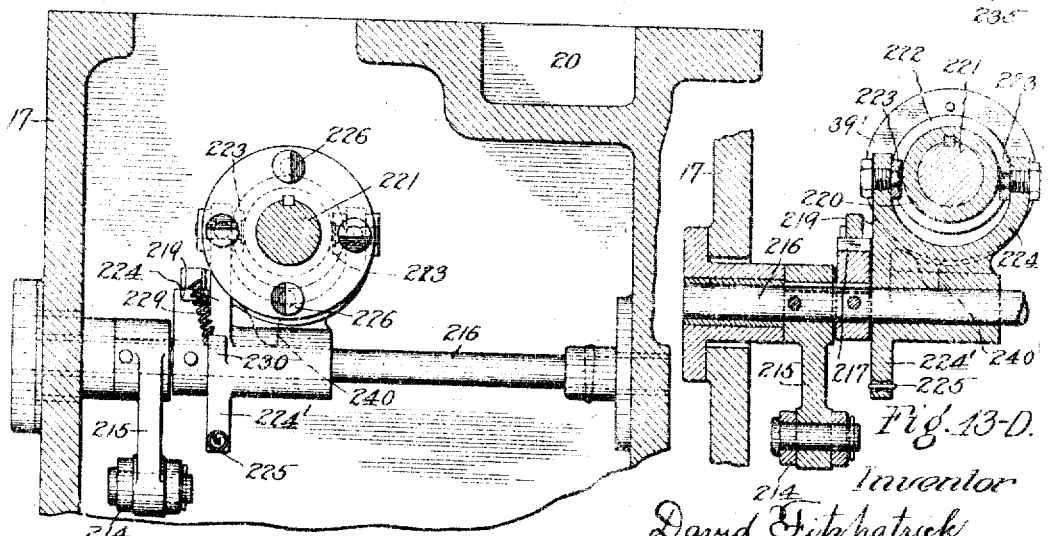
Fig. 13-C.
Fig. 13-D.
Inventor
David Fitzpatrick
by Hillary C. Messimer
his attorneys

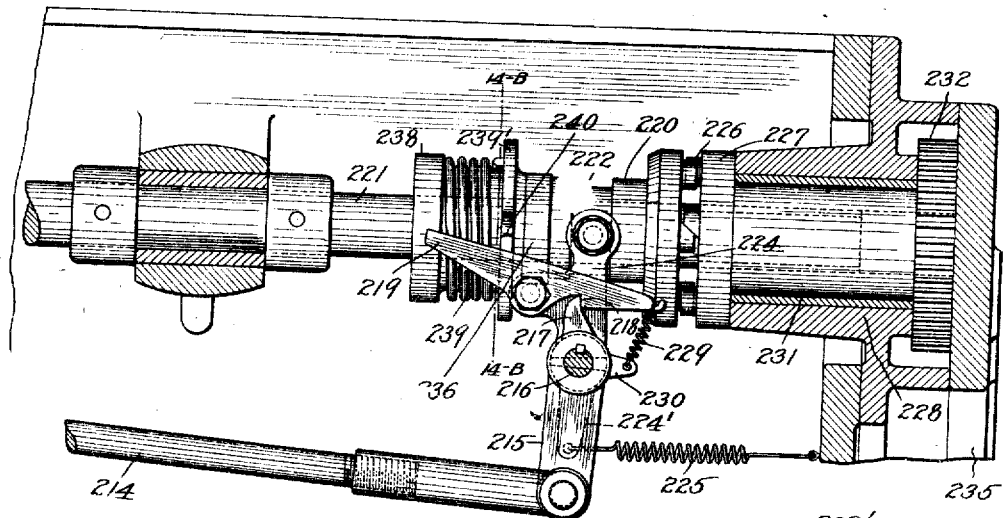

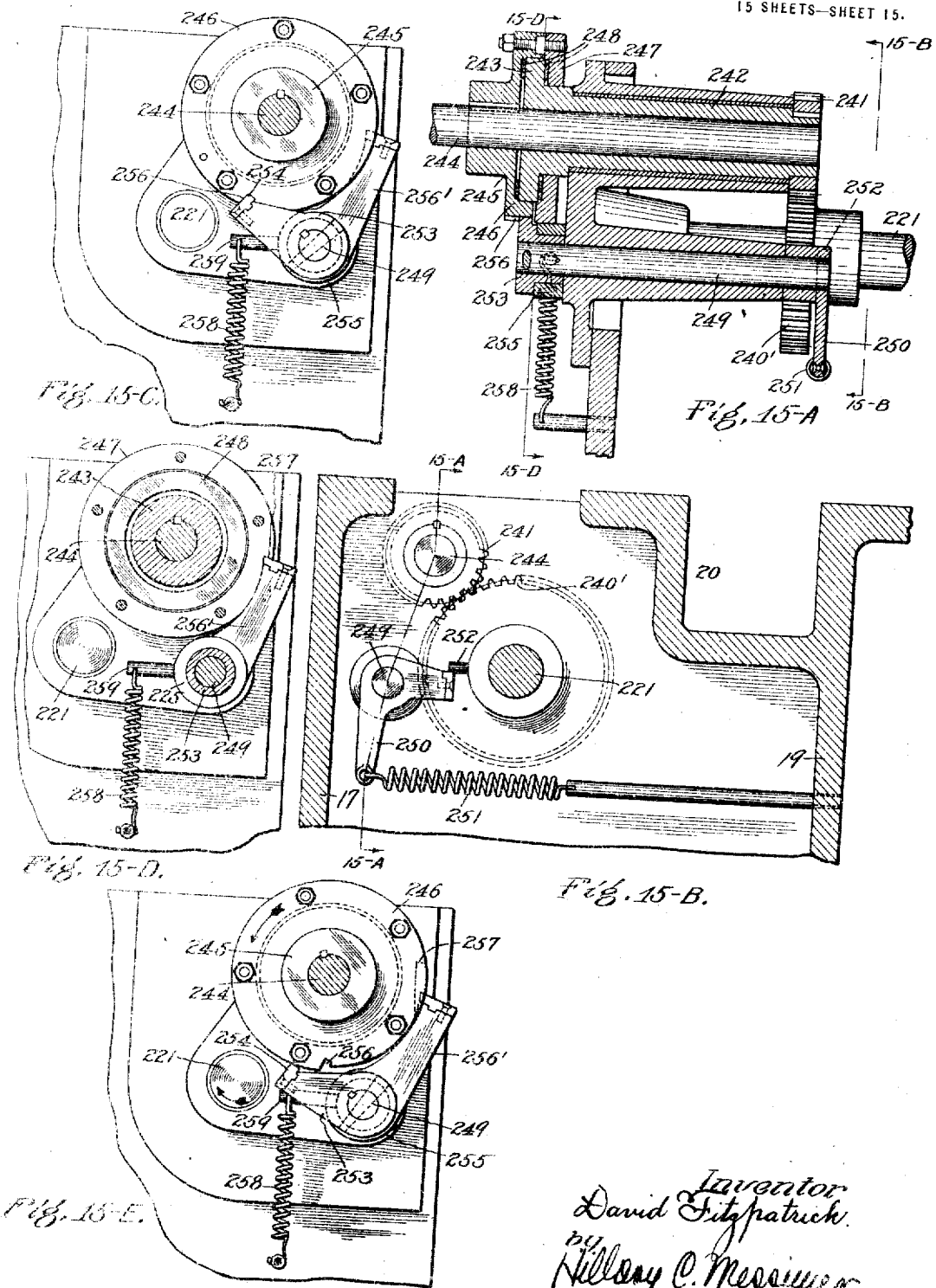

UNITED STATES PATENT OFFICE.

DAVID FITZPATRICK, OF CLEVELAND, OHIO, ASSIGNOR TO THE CLEVELAND WORM AND GEAR COMPANY, OF CLEVELAND, OHIO, A CORPORATION OF OHIO.

THREAD-GRINDER.

1,340,031.   Specification of Letters Patent.   Patented May 11, 1920.

Application filed June 22, 1918. Serial No. 241,405.

*To all whom it may concern:*

Be it known that I, DAVID FITZPATRICK, a subject of Great Britain, and resident of Cleveland, in the county of Cuyahoga and State of Ohio, have invented certain new and useful Improvements in Thread-Grinders, of which the following is a specification.

My invention relates to a machine for grinding worms or similar machine parts having convolute threads. The embodiment of the invention herein selected for illustration may be considered, when used in connection with certain types of work, as an improvement in some of the features of the machine constituting the subject-matter of my co-pending application Serial No. 43,175, filed August 2, 1915.

In this prior application it was pointed out that in grinding a machined worm to size after tempering the same, it was desirable under some circumstances to provide mechanism for moving the grinding tool repeatedly in successive grinding engagements with the different teeth of the worm and that this repeated grinding action be provided without the necessity of any supervision of the cyclic repetition of the grinding act and that the actuation of the machine should be practically automatic from the beginning to the end of the entire grinding of the work.

This automatic actuation necessitated the use of some mechanism for mechanically withdrawing the tool from the worm being ground at the end of each grinding traverse and before the work was indexed and for returning the tool accurately into grinding engagement with the next succeeding thread to be ground.

As the worms are required to be ground accurately to one-forty-thousandths of an inch any loose play in the resetting device would be fatal to the accuracy of the machine.

Under some conditions, especially where the parts were under high tension incidental to forcing the grinding operation, this grinding tool withdrawing and resetting mechanism frequently became worn with resulting inaccuracies in the automatic resetting of the tool in its succeeding grinding operation.

Further when such machines are designed to grind large massive worms the structural parts of the machine must be made of a size to withstand the strains incidental to grinding such large worms and these large massive parts do not readily lend themselves to the delicate mechanism which must be used to insure the proper automatic resetting of the grinding tool at the beginning of each grinding stroke.

Accordingly, the primary object of this invention is to provide a simplified and therefore inexpensive and at the same time a mechanically perfected machine of the type disclosed which will insure a proper grinding of the machined worm, irrespective of the size or massiveness of the movable parts of the machine.

Incidental to this object the invention contemplates an organization of parts which will rotate the work in proper relation to the advance of the grinding tool and which will cause the grinding tool to engage the work while rotating at abnormally high speed and in micrometrically light grinding engagement with the slowly turning worm.

Another object of the invention is to provide a refined, accurately controlled, manual adjustment for setting the grinding tool in any desired operative position and in which the actuation of all parts, which are not contributory to this refined manual adjustment, shall be automatically actuated.

In such machines it is necessary to mount the grinding tool so as to grind both right and left hand worms of different pitch and to provide a flexible power transmission between the main power shaft of the machine and the adjustable tool. Heretofore this transmission has been attained by means of a belt drive which works satisfactory where there is little or no twist to the belt but does not work economically when the grinding tool has been adjusted into one of its extreme positions.

Accordingly another object of the invention is to provide a simple type of flexible transmission which will allow freedom of adjustment of the grinding wheel and which will at the same time, provide an easy running, noiseless and positively acting power transmission between the main power shaft and the grinding tool in all adjusted positions of the same.

In general, however, the invention contemplates the improving in mechanism and organization of the machine parts disclosed in the prior application and in the mechanical perfecting of a machine for accurately and rapidly grinding worms to an exact size with the least expenditure of energy.

Incidental to this desideratum the invention contemplates a construction in which the center of the grinding tool will at all times be alined with the axis of the turning worm irrespective of the angular position of the tool and in this way there is eliminated any necessity for manually setting the tool vertically with respect to the different helix angle of the worms to be ground.

In this embodiment of the invention the grinding tool moves longitudinally with respect to the turning worm and passes through and in grinding contact with the adjacent faces of a pair of contiguous threads. The machine is usually set so that the grinding tool passes beyond the end of the worm so as to clear the worm before the succeeding indexing movement is inaugurated. The advance of the grinding tool is intercepted automatically at the end of its grinding stroke and thrown into an inoperative position and the worm is automatically indexed; after which by manual movement of a lever the grinding tool is automatically returned by the machine at high speed still following the same lead of the worm to a position opposite its initial position and is then reset manually into any desired grinding engagement with the next succeeding thread trough. The tool is then ready to start on its next succeeding grinding operation, and this cycle of movement is repeated until the worm is properly ground.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1$^A$ is a view in front elevation of a completed machine disclosing a preferred embodiment of my invention with the worm in position and all machine parts in a normal inoperative position and with a part of the frame broken away to show internal constructions;

Fig. 2$^A$ is a plan view looking down upon the device shown in Fig. 1$^A$;

Fig. 3$^A$ is a view in end elevation of the left hand side of the machine shown in Figs. 1$^A$ and 2$^A$;

Fig. 4$^A$ is a corresponding view at the right hand side of the machine;

Fig. 4$^B$ is an enlarged view of the swivel head tool drive casing shown at the right hand side of Fig. 4$^A$;

Fig. 4$^C$ is a transverse sectional view taken on the line 4$^C$—4$^C$ of Fig. 4$^B$ and also constituting an enlarged section taken on the line 4$^C$—4$^C$ of Fig. 4$^A$ looking in the direction indicated by the arrows;

Fig. 5$^A$ is a vertical sectional view taken longitudinally of the machine, on the center line of the live and dead centers and on the line 5$^A$—5$^A$ of Figs. 3$^A$ and 4$^A$;

Fig. 6$^A$ is a vertical sectional view taken longitudinally of the machine, through the carriage feed and on the line 6$^A$—6$^A$ of Figs. 2$^A$, 3$^A$ and 4$^A$;

Fig. 7$^A$ is a vertical sectional view taken transversely of the machine through the tool carriage on the line 7$^A$—7$^A$ of Fig. 2$^A$;

Fig. 8$^A$ is an enlarged detailed view of the main power pulley shown at the left of Figs. 1$^A$, 2$^A$ and 5$^A$ and of the main driving shaft and gear casing shown in vertical section taken on the line 8$^A$—8$^A$ of Figs. 2$^A$ and 9$^B$;

Fig. 8$^B$ is a vertical sectional view of the reversing clutch for the main tool drive shaft taken on the line 8$^B$—8$^B$ of Figs. 2$^A$ and 9$^A$;

Fig. 8$^C$ is a vertical sectional view of the clutch controlling the direction of the tool carriage transverse and taken on the line 8$^C$—8$^C$ of Figs. 2$^A$, 9$^A$ and 9$^B$;

Fig. 9$^A$ is a vertical sectional view taken through the main drive gear casing shown in plan in Fig. 2$^A$ and taken on the line 9$^A$—9$^A$ of Fig. 2$^A$ looking toward the right of the machine;

Fig. 9$^B$ is a similar view looking in the opposite direction and taken on the same line for this purpose lettered 9$^B$—9$^B$ in Fig. 2$^A$;

Fig. 9$^C$ is a vertical sectional view through a portion of the tool drive reversing lever catch and taken on the line 9$^C$—9$^C$ of Fig. 9$^A$;

Fig. 10$^A$ is a vertical sectional view through the tool driving connection at the rear of the carriage and taken on the line 10$^A$—10$^A$ of Figs. 2$^A$ and 10$^B$;

Fig. 10$^B$ is a vertical sectional view taken on the line 10$^B$—10$^B$ of Fig. 10$^A$;

Fig. 10$^C$ is an enlarged view of the grinding tool and its spindle casing taken axially thereof, enlarging the similar showings in Figs. 7$^A$ and 11$^A$ and taken on the line 10$^C$—10$^C$ of Fig. 11$^A$;

Fig. 10$^D$ is a transverse sectional view showing the tool spindle adjusting mechanism and taken on the line 10$^D$—10$^D$ of Fig. 10$^C$;

Fig. 11$^A$ is a vertical sectional view through the tool carriage and supporting parts enlarging the showing in Fig. 7$^A$ taken on the line 11$^A$—11$^A$ of Fig. 2$^A$;

Figs. 11$^B$ and 11$^C$ are parallel vertical sectional views through the swivel tool carriage head showing the swivel head adjusting worms and one of the swivel head binding devices, and taken respectively on the line 11$^B$—11$^B$ and 11$^C$—11$^C$ of Fig. 11$^A$;

Fig. 11$^D$ is a plan view of the tool-head-mounting-adjusting device looking down thereon from the plane 11$^D$—11$^D$ of Fig. 11$^A$;

Fig. 12$^A$ is a vertical sectional view taken through the head stock and showing an enlargement of the same parts shown in Fig. 5$^A$;

Fig. 12$^B$ is a horizontal sectional view taken on the line 12$^B$—12$^B$ of Fig. 12$^A$;

Fig. 12$^C$ is a vertical sectional view taken on the line 12$^C$—12$^C$ of Figs. 12$^A$ and 12$^B$;

Figs. 13$^A$ to 15$^E$, inclusive, are enlarged views of portions of the indexing mechanism; Fig. 13$^A$ showing the position of the parts when the grinding wheel is in its grinding position and the indexing mechanism inoperative and enlarging the similar showing in Fig. 1$^A$;

Fig. 13$^B$ is a vertical sectional view taken axially through the main indexing shaft shown in Fig. 13$^A$;

Figs. 13$^C$ and 13$^D$ are transverse sectional views through this shaft and taken respectively on the line 13$^C$—13$^C$ and 13$^D$—13$^D$ of Fig. 13$^A$;

Fig. 14$^A$ is a view similar to Fig. 13$^A$ showing the position of the parts with the indexing mechanism in active operation;

Fig. 14$^B$ is a vertical sectional view through the main indexing shaft showing the latch releasing trip and taken on the line 14$^B$—14$^B$ of Fig. 14$^A$;

Fig. 14$^C$ is a view similar to Figs. 13$^A$ and 12$^A$ showing the position of these parts of the indexing mechanism when the carriage is on its return traverse;

Fig. 14$^D$ is a view similar to 14$^B$ after the lever has been tripped and taken on the line 14$^D$—14$^D$ of Fig. 14$^C$;

Fig. 15$^A$ is a vertical sectional view of the friction clutch and coacting parts of the indexing mechanism at the left of Fig. 1$^A$ and taken on the line 15$^A$—15$^A$ of Fig. 15$^B$;

Fig. 15$^B$ is a vertical sectional view taken on the line 15$^B$—15$^B$ of Fig. 15$^A$;

Fig. 15$^C$ is an end view of the parts shown at the left of Fig. 15$^A$;

Fig. 15$^D$ is a sectional view taken on the line 15$^D$—15$^D$ of Fig. 15$^A$; and Fig. 15$^E$ is a view similar to that shown in Fig. 15$^C$ with the stop plate in rotating position.

Frame.

In the accompanying drawings there is shown a lathe type of machine including a hollow box like supporting bed frame 16, designed to inclose certain parts of the mechanism. The frame includes a front wall 17, a rear wall 18 and a longitudinally extending partition 19 connecting opposite end walls and tending to brace the entire construction. An open top cooling liquid receiving gutter 20 extends forwardly from the upper portion of the partition to receive the drip from the tool carriage and to discharge the same from the left side of the machine (Fig. 5$^A$) through the drip pipe 20'.

Head stock and tail stock.

A hollow box 21 constitutes the head stock of the machine and extends upwardly from the left side of the frame. A cover hood 22 is bolted to the top of the box to inclose the live center driving mechanism mounted therein. A massive work table 23 provided on its upper face with a longitudinally extending inverted T-slot 24 (Fig. 7$^A$) is fixed to the front portion of the top of the frame, is fitted between the front wall 17 and front edge of the gutter 20 and extends from the head stock 21 to the right end of the frame 16. The upper front edge of the work table is provided with a V-shaped rib 25 outlining the forward part of the bearing surface provided by the top of the work table.

A longitudinally movable tail stock 26 is slidably mounted on the work table and is held thereon against transverse movement by means of a groove 27 in the underside thereof engaging the rib 25, (Fig. 4$^A$). A pair of longitudinally spaced studs 28 are inclined vertically at an angle through the tail stock, as shown in Fig. 4$^A$, with their heads disposed in the slot 24 and adapted to be raised into binding engagement therewith by the adjustable nuts 29 threaded to the top of the studs and bearing on the tail stock. The tail stock carries a longitudinally adjustable slide 30 (Fig. 5$^A$) controlled by an adjusting thumb screw 31 for moving the dead center 32 toward and from the live center 33 carried by the head stock. The work W to be ground is centered between the pointed end of the live and dead centers and held to the live center so as to be rotated thereby in any manner usual in lathe constructions of this character. The dead center is locked in position bearing on the adjacent end of the work by means of a pair of clamping screws 34 carried by the tail stock and designed to bear on the side of the slide 30.

Tool carriage.

The upper portion of the frame 16 to the rear of the table 23 provides a support for a tool carriage 35 bodily movable longitudinally of the machine. This tool carriage includes a bottom member 36 constituting a saddle (Fig. 7$^A$) for carrying the swivel head tool mounting 37. The saddle is provided at its rear side with a depending guiding rib 38 slidably mounted in a V-shaped groove 39 formed in an extension 40 at the top of the rear wall 18. The portion of the saddle between the portion 19 and the rear wall is long compared to the length of the frame as shown in Figs. 2^A and 6^A, so as to provide a long bearing engagement with the frame. The middle portion of the saddle is concaved to form a cooling liquid receiving basin 41 (Fig. 11^A). The lowermost portion of the basin is provided with a drain opening 42 discharging the cooling liquid drip into the gutter 20 in all positions of the carriage. The forward portion of the saddle is reduced in width to form a bearing block 43 which rests upon the work table and is guided by the rib 25. The saddle includes as part of its internal bracing structure a pair of upstanding transversely disposed walls 44 and 45 (Fig. 6^A) constituting a guiding support for the transversely movable swivel head tool mounting 37. The top of the wall 44 is T-shaped and directly supports the main cylindrical bearing portion 46 of the mounting. The other wall 45 is wider than the wall 44 and is provided with a V-shaped channel 47 constituting a guide for a depending rib 48 formed on a buttress portion 49 which extends toward the head stock end of the machine and depends from the cylindrical portion of the mounting. The mounting is removably held in position on the saddle by means of a pair of plates 50 fastened to the mounting and underlapping the T-headed shoulders formed at the top of the walls 44 and 45. A tool carrying swivel head 51 includes a lower, substantially cylindrical hollow barrel 52 rotatably mounted in the cylindrical portion 46 for rotary movement about a horizontal axis indicated by the line a—a of Figs. 7^A and 11^A and an inverted U-shaped arm 53 constituting a gear train and spindle casing. The cylindrical barrel is reduced and a gear 54 is shrunk thereon and fastened by a key 55 (Fig. 11^D). A worm 56 extends longitudinally of the machine and transversely of the axis of the portion 46 and meshes with the gear 54 (Figs. 6^A and 11^A). This worm has opposite ends mounted in a journal box 57 constituting an upward extension of the cylindrical part 46. Opposite ends of the worm project beyond the extension and are provided with tool engaging heads 58 by means of either of which the worm may be rotated to adjust the angular position of the grinding tool 59 from the dotted line position shown in Fig. 5^A, to a position of slightly more than 90° in either direction from the dotted line position shown in Fig. 5^A.

The adjusted swivel head is locked in position by a pair of clamping devices 60 mounted in the box 57 on opposite sides of the worm 56. These clamping devices each include a pair of clamping blocks 61 (Fig. 11^C) mounted in a guide-way 62 and bearing in one case on the cylindrical part of the barrel 52 or on the extension 62' of the worm 54. A tensioning screw 63 has a left hand threaded portion 64 threaded into one of the clamping blocks and a right hand threaded portion 65 threaded through the opposite block, and so arranged that the rotation of the screw in one direction will cause the blocks to approach each other, bear on and thus clamp the swivel head therebetween and hold the same rigidly fixed to the portion 46. The top of the arm 53 is horizontally disposed and constitutes a housing for a gear train which drives the grinding tool 59 and is closed by means of a top bearing plate and cover 66 fastened in place by screws 67. The front of the head is provided with an open front shield 68 surrounding the tool, the front edge of which projects beyond the front of the head and shield (Figs. 2^A and 7^A).

*Means for moving the grinding tool laterally.*

The grinding tool is adjusted to and from the work in a direction transverse to the axis of rotation thereof by means of a hand wheel 70 mounted at the front of the machine (Figs. 1^A, 2^A and 11^A) and provided with a handle 71 conveniently accessible to the operator. This advancing mechanism is carried by the bearing block 43 constituting the part of the saddle which rests on the work table 23. The mechanism includes a headed sleeve 72 rotatably mounted in the block and projecting forwardly of the front of the machine. The sleeve is held in position in the bearing block by means of the hand wheel 70 which is connected thereto by means of a key 73 and fastened in place by a nut 74 threaded on the outer end of the sleeve. A screw block 75 is mounted centrally in the sleeve 72 and is held thereto by means of pins 76. A feed screw 77 has one end thereof threaded into the base 78 of the swivel head mounting and is fixed thereto by means of a pin 79. The forward end of the screw is threaded through the block 75 and is so arranged that the rotation of the hand wheel 70 in one or the other direction will draw the swivel head mounting and the tool toward and from the work, depending upon the direction of rotation of the hand wheel.

*Feeding micrometer dial.*

The hub 80 of the hand wheel is reduced to form a shoulder 81, and collar 82 encircles the reduced portion of the hub and fits between the shoulder and the front face of the block 43. The collar (Fig. 11^D) is provided with a scale 83 graduated in angular degrees which scale coacts with a "zero" mark 74' on the top of the block to indicate a possible angular rotation of the screw 77. The collar is free to rotate about the hub so that it may be present in any desired position, in which position the collar is fixed by means of a set screw 85 threaded through the collar and engaging in a peripheral slot 86 formed in the reduced portion of the hub 80.

Main power drive.

Power is taken into the left end of the machine through a pulley 90 acting on a main power shaft 91 which leads into a casing 92 designed to house the main power drive (Fig. 2ᴬ). The casing is a long flat hollow box mounted upon the frame 16 at the left end of the machine, and positioned in rear of the head stock. This casing contains the drive mechanism for receiving the power from the main shaft and for distributing the same to the carriage shifting mechanism, to the indexing mechanism and to the tool drive.

An L-bracket 93 (Figs. 1ᴬ, 5ᴬ and 8ᴬ) projects from the left end of the machine and constitutes an out bearing for one end of the main power shaft, the inner end of which shaft extends transversely through and is journaled in the inner wall 94 of the casing.

The drive pulley 90 is free on the shaft 91 and is belted to any suitable power source.

The pulley is designed to be coupled to the main shaft at will by means of an actuating lever 95 positioned at the left front end of the machine. This coupling device includes a transversely extending rocking shaft 96 (Figs. 2ᴬ and 3ᴬ) mounted in brackets 97 at the left-hand end of the machine and provided at its front end with the lever fastened thereto. The rear end of the rocking shaft is provided with an up-standing yoke 98 engaging in a peripheral groove 99 formed in a spool 100 slidably mounted on the portion of the main shaft exterior of the casing. The spool is provided on the end adjacent the pulley with a conical nose 101 movable on an anti-clockwise rotation of the lever from the position shown in Fig. 2ᴬ into engagement with the fork arms 102 which are positioned on opposite sides of the shaft and fixed to a sleeve 103. This sleeve is split, is keyed on the shaft and is fitted within the hub of the drive pulley 90. The tension with which this inner split sleeve is caused to engage the pulley is regulated by a pair of set screws 104 which are threaded into the arms 102 and constitute bearing points for the nose. By means of this construction the rotation of the lever 95 in an anti-clockwise direction will connect the source of power with the machine and the rotation in the opposite direction will move the parts into the inoperative position shown in Fig. 2ᴬ in which case the pulley runs idle.

The portion of the main shaft within the casing has three gears 105, 106 and 107 (Fig. 8ᴬ) affixed thereto; the gear 105 constitutes the initial gear of a gear train for driving the main shaft 108 of a tool rotating mechanism in one direction, and the gear 107 similarly constitutes the initial gear of a gear train for rotating this shaft in an opposite direction.

The first mentioned gear train (Fig. 9ᴮ) includes the gear 105 (Fig. 2ᴬ) engaging a first intermediate gear 109 which meshes with a second intermediate gear 110 (Fig. 8ᴮ) and this in turn meshes with a final gear 111. This final gear (Figs. 9ᴬ and 8ᴮ) is fixed to a tooth-clutch element 112 loose on the shaft 108.

The reversing gear train includes the gears 107 (Fig. A.) in mesh with an intermediate gear 113 which in turn meshes with the final gear 114, keyed to a tooth clutch element 115, also loose on the shaft 108.

A double ended tube clutch element 116 (Fig. 8ᴮ) is keyed to and slidably mounted upon the shaft 108 and is designed to be moved into clutching engagement with either of the coacting clutch elements 112 or 115, so as to drive the shaft in either a direct or in a reversed direction. The position of the clutch is controlled by means of a hand lever 117 mounted at the back of the machine (Figs. 3ᴬ and 9ᴬ). The lower end of the lever is fixed to the portion of a shaft 118 which projects exteriorly of the casing 92 and the inner end has a yoke 119 (Fig. 8ᴮ) fixed thereto and engaging the element 116. The lever carries a plunger 120 (Fig. 9ᶜ) held pressed toward an arc plate 121 positioned at the rear of the casing 92. The plate is provided with three notches 122, and the plunger is forced by a spring 123 designed to force the pointed end 124 of the plunger into one of the notches in the plate. These notches are so disposed that the end of the plunger, when positioned in the correct notch, will hold the clutch in either direct, reversed or the neutral position shown in Fig. 8ᴮ. A binding screw 125 extends through the side of the lever and engages a slot 126 in the plunger for the purpose of preventing the plunger from rotating about its axis and may be used for the purpose of locking the plunger in position when in any one of the notches. By this construction it is possible to set the machine into the position to drive the tool in either rotary direction and to lock this element of the machine when so set.

Grinding tool drive.

The main tool driving shaft 108 is supported at the tail stock end of the machine (Fig. 2ᴬ) by a bracket 130 projecting upwardly from and rigidly fastened to the frame 16. The thrust on the shaft in this direction is taken up by means of a thrust collar 131 having a driving fit on the shaft so as to rotate with the same. A flat washer 132 is positioned loosely on the shaft between the thrust collar and the bracket. The outer end of the shaft is provided with a nut 133, screwed and pinned thereto which acts on a thrust collar 134 positioned between the nut and the bracket to take up thrusts in the opposite direction.

*Mechanism for carrying tool drive through swivel head.*

Power is taken from the shaft 108 for driving the tool 59 in all positions of the same. For this purpose a sleeve 135 (Fig. 7A) is fastened to the shaft 108 by means of keys 136 engaging key-ways extending longitudinally in the shaft. A spiral gear 137 is fixed to the sleeve so as to be movable therewith. This spiral gear is continuously in mesh with a right angularly disposed spiral gear 137a keyed to a spline shaft 138 through the right angled connection thus provided. This spline shaft is journaled in a bracket 139 which constitutes a housing for the gears 137—137a and is fixed to the rear of the saddle, so as to be movable therewith. This spline shaft extends forwardly into the hollow cylindrical barrel 52 and is concentrically disposed with reference to the axis a—a. This shaft is provided with a longitudinally extending key-way 140 (Fig. 11A) in which is slidably mounted a key 141 for fastening a bevel gear 142 to the shaft 138. The gear 142 is positioned within the hollow cylinder 52 and is provided with a rearwardly extending hub 143 rotatably mounted within a bearing 144 forming a rearward extension from the rear face of the cylindrical portion 52. By means of this construction it is possible to shift the tool carriage while maintaining a driving connection with the shaft 138, whereby rotary motion is transmitted from the main shaft to the gear train positioned in the hanging arm 53. The gear 142 meshes (Fig. 11A) with a gear 146 mounted on the lower end of an upstanding shaft 147 mounted in bearings 148 in the rear end of the swivel head 51. A spiral gear 149 is attached to the upper portion of the shaft 147 and constitutes the first member of a horizontally disposed gear train extending forwardly in the arm 53. This gear train includes an intermediate spiral gear 150 which meshes with the gear 149 and with the small gear 151 of a compound gear set, the large gear 152 of which meshes with a small gear 153 fixed to the tool spindle 154.

This gear train receives the relatively slow rotary motion of the main driving mechanism and transmits the same into relatively high speed motion so as to rotate the grinding tool 59 at unusually high speed. It is understood that in a device of this character it is essential that the work be turned at relatively slow speed while the grinding tool on the contrary has the highest speed economically possible with a device of this character.

*Mounting for grinding tool spindle.*

The spindle 154 is centered within a cylindrical bore 155 contained within the front of the head 51 and depending from the hollow portion of the arm containing the gear train. This hollow portion of the arm constitutes an oil reservoir for bathing the gear train, the shaft 147 and the spindle 154 in oil. A bushing 156 has a suction fit in the bore 155 and is provided with a frusto-conical bore 157 within which is rotatably mounted a similarly shaped portion 158 of the spindle. The bushing is held in position (Fig. 10c) by means of screws 159 threaded through the side of the head. A stuffing box 160 is screwed to the lower end of the bushing, so as to force the packing 161 into close engagement with the spindle and thus prevent oil from dripping from the gear casing. A portion of the spindle adjacent its lower end is provided with a frusto-conical tool receiving portion 162 upon which is mounted the hub 163 of the grinding tool, which is held in position by means of a clamping plate 164, in turn held in position by means of a left hand nut 165 threaded to the spindle. A right hand nut 166 engages the extreme end of the spindle and bears on the left hand nut so as to constitute a lock nut combination for holding the tool to the spindle and for the purpose of bearing on the clamping plate thereby to force the tool into engagement with its hub and therethrough to act on the hub to force the same into a frictional tight engagement with the spindle. By this construction it is seen that the high speed centrifugal force generated by the rotation of the spindle and grinding tool has a tendency to force one nut against the other and thus secure these parts against accidental displacement.

*Adjustment of grinding wheel spindle.*

The upper radial load and the thrust load in both longitudinal directions of the spindle is taken up by means of a radio thrust bearing at the upper portion of the spindle. This bearing includes a flanged barrel 167 fitted in the upper end of the spindle casing and provided with a closing cap 168. The bore of the barrel is screw-threaded to receive a ball-bearing housing 169 threaded into the barrel and encircling the upper portion of the spindle. This upper portion of the spindle is reduced to provide a shoulder 170 for supporting an inner runway 171 of a ball-bearing mounting for the spindle. The runway is held in place by means of a nut 172 screw-threaded onto the upper end of the spindle. A cotter pin 173 passes through the end of the spindle to hold the nut 172 in place against rotation. An outer runway 174 of the mounting is held in place by means of a retaining ring 175 in screw-threaded engagement with the upper portion of and constituting part of the housing. By adjusting this ring any end play of the bearing is taken up. The threaded portion of the sleeve 169 permits adjustment of the grinding tool so as to keep it on the line "a—a" Fig. 11ᴮ. The outer runways of the ball bearings are clamped between the flange on the inner bore of the sleeve 169, and the sleeve 175, the inner runways through the sleeve 178 and the nut 172. A spacing sleeve 178 clamps the gear 153 to the shoulder 179 of the spindle thereby allowing the adjustment of the grinding tool to and from the line "a—a" Fig. 11ᴮ by rotating the threaded sleeve 169. The threaded portion of the sleeve 169 permits adjustment of the grinding tool and the entire spindle. In this adjusted position of the bearing and of the grinding tool the parts are locked by means of a pin 177 positioned to extend across any of the alined slots 176.

The grinding tool 59 is fashioned to have a fit between the opposite sides of the threads of the work being ground so as to grind opposite sides of the trough of the threads at each grinding movement of the device. The grinding wheel is positioned with its axis of rotation intercepting the axis of the spline shaft 138 indicated by the line a—a. The center of the wheel is also positioned in the axis of rotation of the work when held between the centers. By this construction it will be seen that the center of the grinding wheel will remain fixed on the axis a—a and on the axis of the work irrespective of the angular position of the grinding wheel head.

Drive for carriage return.

The main gear 105 (Fig. 2ᴬ) meshes with an idler gear 180 which in turn meshes with a gear 181 journaled in the casing 92 and loose on the longitudinally extending carriage drive worm shaft 182 (Fig. 8ᶜ). The inner part of this gear 181 is designed to constitute one element 183 of a friction clutch, the other element 184 of which constitutes a reversing clutch and is slidably keyed to the shaft 182. The shaft 182 extends (Fig. 6ᴬ) lengthwise of the machine and is positioned below the saddle and is mounted in end bearings 185 carried at the tail stock end of the machine and in end bearings 186 carried at the head stock end of the gear casing. The portion of the shaft beneath the saddle is provided with lead threads 187 passed through a nut 188 fastened to the underside of the saddle by means of screws 189 and a pin 190. This construction is so arranged that with the clutch element 184 in its left hand position shown in Figs. 8ᶜ and 6ᴬ, the rotating shaft will move the carriage at high speed from the right or tail stock end to the left or head stock end of the machine.

Drive for carriage traverse.

A gear 106 (Fig. 8ᴬ) on the main drive shaft meshes with gear 191 (Fig. 9ᴬ) keyed on a worm shaft 192. The worm shaft 192 is mounted in bearings 193 fixed to the side of the gear casing and extends forwardly of the machine beneath the shaft 182, (Fig. 8ᶜ).

The underside of the worm of the worm shaft is in mesh with a gear 194 keyed to a power transmission shaft 195 which runs to the tail stock end of the machine without any attachment thereto except a gear 196 keyed to the same exteriorly of the right hand end of the frame 16. (Fig. 6ᴬ).

The upper side of the worm meshes with a gear 197 and coacts with this gear to form a reducing gear train for transmitting the relatively high rotary speed of the main shaft into relatively slow speed of the carriage moving screw 187. The gear 197 (Fig. 8ᶜ) is fixed to a face clutch element 198 loose on the shaft 182. The clutch element is designed to coact with the clutch element 184 so that when the element 184 is shifted to the right from the position illustrated and is moved into engagement therewith, the lead screw shaft 182 will be rotated in a direction to move the carriage from the head stock end toward the tail stock end of the machine on its grinding traverse.

Manual mechanism for controlling reversing clutch.

The movement of the clutch element 184 is controlled by means of a hand lever 199 at the front of the machine which lever is connected to a shaft 200. The shaft extends transversely of the machine and is provided at its rear end with a yoke 201 engaging the clutch element 184. By this construction a movement of the lever 199 from its upright, neutral position to the right will cause a movement from left to right of the carriage and swinging the lever to the left will cause a movement from right to left of the carriage.

Automatic mechanism for controlling reversing clutch.

A stop rod 202 (Fig. 1ᴬ) is slidably mounted in brackets 203 on the front of the machine for movement parallel to the direction of movement of the carriage. The rod is provided with a pair of stop collars 204 and 205 adjustably mounted on the rod and fixed thereto by binding screws 206. The stops are disposed on opposite sides of a stop arm 207 which projects forwardly from the saddle and engages the rod between the collars, (Figs. 1ᴬ and 2ᴬ). The left end of the stop rod is provided with a head 208 to which is pivoted one end of a link 209, the opposite end of which is pivoted to the upper end of a lever 210, fixed rigidly to the transversely disposed index controlling shaft 211. The lower end of the lever 210 is connected by means of a link 212 to the hand lever 199.

By this construction the movement of the stop arm into engagement with the right hand collar 204 acts on the stop rod and through the stop rod and lever 199 to move the reversing clutch element 184 into a disconnected, neutral or inoperative position. Correspondingly, the movement of the stop arm into engagement with the left hand collar 205 will throw the clutch element in the opposite direction into a disconnected neutral or inoperative position.

*Mechanism for indexing work.*

The rear end of the shaft 211 is provided with a depending lever 213 shown in dotted lines in Fig. 1ᴬ. The lever is connected at its lower end to a reach rod 214 extending toward the tail stock end of the machine and connected to the lower end of a lever 215 fixed to a shaft 216 (Figs. 13ᶜ and 13ᴰ) journaled in the frame at the right hand side of the machine. A bell crank lever is free on the shaft 216. An upstanding finger 217 is fixed to the shaft 216, which finger is designed to engage in a notch 218 (Fig. 14ᴬ) on the underside of a horizontally disposed trip lever 219, which lever is pivoted intermediate its length to a yoke member 224 (Fig. 13ᴮ). The clutch member is keyed to a main indexing shaft 221 which extends horizontally of the machine between the work table and head stock frame and is journaled into the right end of the machine. The clutch element is in the form of a sleeve provided with a peripheral groove 222 in which are positioned rollers 223 journaled in opposite ends of a rocker yoke arm 224 loosely pivoted to the shaft 216 (Fig. 13ᴰ). An arm 224' depends from the yoke arm and is engaged by a spring 225 (Fig. 14ᴬ) normally acting on the clutch element to move the same into unclutched position, shown in Figs. 13ᴬ and 14ᶜ. The clutch element is provided with bevel clutch teeth 226 on its outer face designed to engage the teeth of a coacting clutch member 227 loose on the shaft 221, and mounted in bearings 228 at the right end of the machine. A vertically extending spring 229 connects the right hand end of the trip lever with a horizontally disposed arm 230 of the bell-crank lever, to hold the trip lever resiliently in bearing engagement with the top of the finger 217. The clutch element includes a sleeve 231 which extends beyond the right hand end of the frame and is provided at its outer end with a driving gear 232. Power is supplied to the gear 232 from the gear 196 (Fig. 6ᴬ) by means of a gear train which includes the gears 233 and 234 (Fig. 4ᴬ) contained in a housing 235 mounted at the right end of the machine.

The movement of the clutch member 220 into unclutched position is limited by means of a sleeve 236 (Fig. 13ᴮ) pinned to the shaft 221. A spring bearing sleeve 237 is pinned to the stop collar 236 and is provided at one end with a flange 238 to which is fastened one end of a helical spring 239 encircling the bearing sleeve 237 and having its opposite end attached to a tripping disk 239' rotatably mounted upon the sleeve 236 and fitted between the end of the sleeve 237 and a flange on the sleeve 236. The disk 239' is provided with a laterally extending finger 240 (Fig. 14ᴮ) projecting from the periphery and designed to be rotated by the shaft 221 to bear resiliently on the left hand side of the trip lever 219 for raising the right hand end clear of the finger 217 to permit spring 225, to act on the bell-crank lever and thus rotate the shaft 216, thereby to shift the clutch element 220, together with its teeth 226 into the unclutched position shown in Figs. 13ᴬ, 13ᴮ and 14ᶜ.

By this construction the movement of the clutch teeth 226 into engagement with the continuously rotating teeth 227 will cause the shaft 221 to revolve approximately once before the clutch elements are kicked into their inoperative position by the releasing action of the tripping lever 219.

The shaft 221 has a spur gear 240' adjacent its left end (Fig. 5ᴬ) which meshes with a spur gear 241 (Fig. 1ᴬ) fixed to the outer edge of a sleeve 242 (Fig. 15ᴬ) journaled in the left end of the machine beneath the head stock 21. The gear 241 is of slightly less diameter than the gear 240' so that the gear 240' will not only cause the gear 241 to turn once but will also possess some rotary motion after the indexing mechanism connected therewith has made a complete turn. The inner end of the sleeve is defined by a flat disk 243 constituting one element of a friction clutch drive. The sleeve constitutes a bearing for the inner end of a second driven indexing stud shaft 244 extending to the outside of the machine. A clutch member 245 for coacting with the disk 243 is keyed to the shaft 244 and comprises a drum 246 revoluble with the shaft and a flat ring 247 loose on the sleeve 242 and adjustably pinned to the drum with the disk positioned therebetween. Leather friction rings 248 are positioned between the faces of the disk and the adjacent faces of the drum and ring. A short clutch controlling shaft 249 is journaled below and parallels the shaft 244. The inner end of this shaft 249 is provided with a tripping arm 250 adapted to be lowered from the position shown in Fig. 15° against the action of a spring 251 by means of a pin 252 projecting laterally from the hub of the gear 246. The outer end of the shaft 249 is provided with an arm 253 (Fig. 15°) the outer end of which is defined by a tooth 254 designed to lock in a notch 256 in the drum 245 to lock the shaft 244 against rotation. A bell crank lever 255 is loosely mounted upon the hub of the arm 253. An upwardly extending arm 256′ of this lever constitutes a pawl for engaging a notch 257 in the periphery of the ring 247 to prevent reverse movement of the shaft 244. A spring 258 acts on the other arm 259 of the bell-crank lever to maintain the arm 256′ in resilient bearing engagement with the periphery of the ring 247 when in rotation.

A gear 255′ (Fig. 3ᴬ) is demountably fixed to the outer end of the shaft 244 and constitutes the driving element of a train of gears, the last gear 290 of which train is demountably fixed to a shaft 291 extending into the head stock of the machine. One or more intermediate gears 292 of the train are adjustably and demountably positioned on a transversely swinging frame 293 designed to mesh different size intermediate gears with the fixed end gears 255′ and 290 of the gear train thereby to control the angle of rotation of the work at each indexing movement of the machine.

Mechanism for carrying indexing movement through head stock.

The shaft 291 (Fig. 12ᴮ) extends into the head stock 21 and has a large gear 294 which meshes with a smaller gear 295 constituting part of the right hand gear member 296 of a differentiate gear set loosely mounted on a shaft 297 which parallels the shaft 291. This gear set also includes a bevel gear 298 constituting the left hand member of the gear set and which when the indexing mechanism is functioning may be considered as the held gear of the gear set. Both gears 296 and 298 mesh with the intermediate bevel gear 299 of the gear set and this intermediate gear is loose on trunnion 299′ which is pinned to the shaft 297. A bevel gear 300 is keyed to the inner end of the shaft 297 and meshes with a bevel gear 301 pinned to a transverse shaft 302, the forward end of which projects through the front of the head stock. A worm 303 is normally clamped to the shaft 302 and meshes with a worm wheel 304 (Fig. 12ᴬ) keyed to a live center spindle 305, rotatably mounted in bearings 306 constituting part of the head stock. The spindle drives the live center 33 demountably fitted therein. By this means when the gear 298 is held against rotation the work may be rotated over an angle depending upon the ratios of the gears in the train 255′—290.

Live center drive.

A spur gear 307 (Fig. 8ᶜ) is keyed to the outer end of the shaft 182 and constitutes the driving element of the forwardly and upwardly extending train of gears shown in Fig. 3ᴬ. The gears are accessible from the left end of the machine and includes an intermediate gear 308 adjustably mounted in a rocking frame 309 which is pivotally mounted on a bearing hub 311 (Fig. 8ᶜ) projecting from the frame 16. The frame is fastened in adjusted position by means of a bolt and slot connection 312. The gear 308 meshes with a driven gear 313 fixed to the outer end of a short shaft 314 (Fig. 12ᴮ) which carries a spur gear 315 positioned within the head stock. The gear 315 meshes with a gear 316 loose on the shaft 297 and shrunk on the left end bevel gear member 298. By means of this mechanism and when the right hand member 296 is locked against rotation by the indexing mechanism, the work W is rotated in one direction while the head screw 187 is advancing the tool carriage in its grinding direction from the head stock toward the tail stock end of the machine.

Mechanism for adjusting work.

The worm 303 (Fig. 12ᴮ) is provided with an extension 318 in the form of a sleeve projecting forwardly through the front of the head stock to which extension is fixed a hand wheel 319 held tight against a shoulder 320 on the sleeve by means of a jam nut 321 threaded to the forward end of the extension. The wheel is provided with a centrally disposed cone flange rim 322 engaged by a cone disk 323 keyed to the shaft 302. The cone disk is normally held in frictional engagement with the wheel by means of a jam nut 324 threaded to the outer end of the shaft 302 and bearing on the disk.

Setting for swivel head mounting.

To facilitate the accurate setting of the tool 59 in its angular position to match the inclination of the threads to be ground, the head 51 is provided with a plate 325 (Fig. 4ᴮ) at its rear end. The circular edge of the plate is concentrically disposed relative to the axis *a—a* and is provided with an angular scale 326 coacting with a zero mark 327 (Fig. 4ᶜ) carried by a scale plate 328 fixed to the barrel 37. This scale plate is provided with a vernier scale 328′ coacting with the scale 326 and graduated in minutes, so that the angular adjustment of the tool may be accurately determined.

In operation, and assuming that the work is properly centered for rotary movement between the live and dead centers and that the grinding tool is in proper grinding relation to grind both sides of the engaged threads of the work W, power is supplied to the machine by a belt attached to the pulley 90. The lever 93 is then shifted to the left forcing the nose 100 into engagement with the end of the screws 104 and acting thereon to expand the inner sleeve 103 so as to clutch the pulley 90 frictionally to the main driving shaft 91.

By suitably shifting the hand lever 117 at the back of the machine to engage in either the right or left notch 122, power is transmitted to the main grinding shaft 108 to rotate the same and through this shaft to rotate the tool in either a clock-wise or anti-clockwise direction. It is understood that when a right hand worm is being ground the carriage moves from left to right and the worm turns in a clockwise direction when viewed toward the head stock so that the grinding tool is moving in the same direction. When a left hand worm is being ground the carriage is set to move from the head stock end toward the tail stock end of the machine on its grinding traverse and the direction of rotation of the grinding tool is against the rotation of the worm. Traced in detail power is taken from the shaft 108 and is transmitted through gears 136 and 137ª to rotate the shaft 138, the speed of which is multiplied through the gear train 149—153 to rotate the grinding wheel 59 at relatively high speed.

*Movement of carriage and live center.*

Further let it be assumed that the hand lever 199 is in position swung to the right of the position shown in Fig. 1ᴬ so that the clutch member 184 is meshing with the gear clutch member 198. Power is then taken off the main shaft 91 and drives the carriage shifting shaft 182 through the transmission formed by the worm 192, gear 197 and clutch members 184 and 198. The rotation of the shaft 182 revolves the lead screw 187 to move the carriage from the left or head stock end of the machine toward the right or tail stock end of the machine in its grinding operation. At the same time power is taken off the outer end of the shaft 182 to actuate the live center. This connection is provided by means of the gear train formed by the gears 307, 308, 313, shaft 314, gears 315 and 316, gear set 298, 299, gears 300 and 301, worm 303 and gear 304 to the spindle 305 and live center 33.

It is thus seen that the tool is revolving at high speed, that the live center is turning the work at a relatively slow speed and that the carriage is fed along the work at a rate to keep the grinding tool in proper contact with the threads of the worm being ground.

*Operation of indexing mechanism.*

During this movement of the tool carriage from left to right, the indexing shaft controlling mechanism at the right of the machine is in its normal position shown in Fig. 13ᴬ, with the clutch member 227 running idly. The power to actuate this clutch member is derived from the main shaft 91 through the gears 106 and 191, worm shaft 192, gear 194, shaft 195, and the gear train formed by gears 196, 233, 234 and 232.

As the carriage moves to the right its stop arm 207 engages the set stop 204 at the end of grinding traverse of the carriage and acts through this stop to shift the rod 202 to the right of the position shown in Fig. 1ᴬ. This movement of the rod 202 acts through the link 209 and lever 210 to swing shaft 200. Swinging the shaft 200 disconnects the clutch element 184 from the clutch element 183 thus breaking the connection between the main power shaft 91 and the shaft 182. This intercepts the movement of the carriage and of the live center and stops the grinding operation of the machine at any point defined by the stop 204. The operator usually then moves the grinding wheel clear of the work by actuating the wheel 70, as hereinafter described, but the stop 204 is usually set so that the grinding wheels move beyond the end of the worm being ground before the carriage is stopped. The operator manually moves the lever handle 199 farther to the left thus further rotating the shaft 211. The shaft 211 acts through the arm 213, rod 214 and arm 215 to swing the indexing mechanism controlling clutch parts shown in Fig. 13ᴬ into the position shown in Fig. 14ᴬ thereby to bring the clutch teeth 226 firmly into clutching engagement with the continuously revolving teeth 227.

This movement is effected by the swinging of the finger 217 on the shaft 216 engaging the notch 218 on the trip lever 219 thereby to slide the clutch element 220. Rotary motion is thus transmitted from the gear 232 to the shaft 221. This shaft causes its gear 20 at the left end of the machine to rotate, thus bringing its tripping pin 252 into position to bear on the arm 250 thereby to move its catch 254 out of locking engagement with the drum 246. This acts to unlock the shaft 244, thus permitting shaft 221 to drive shaft 244 through the meshed gears 240'—241 and through the frictional clutch provided by the disk 243 running between the leather rings. The shaft 244 acts through the train of gears, 255', 2.., and 290 to rotate the shaft 291. This shaft acts through the gears 294 and 295 to rotate the right hand member of the differential set which in turn acts to rotate the shaft 297 and through meshed gears 300 and 301 to rotate the worm 303. This worm in turn acts through the worm 304 to rotate the live center over an angle depending upon the ratio of the gears in the train formed by the gears 255', 292 and 290.

*Stopping indexing movement.*

At the start of the indexing movement it is assumed that the finger 240 is approximately in the position shown in Fig. 14⁰, in which position it has been snapped by the spring 239 from the previous actuation of the device. When the shaft 221 carrying with it the finger 240 has made somewhat less than a complete revolution the finger will stroke down on the left end of the trip lever 219 causing the right end to swing from the position shown when the tension on spring 239 overcomes the tension of spring 229 in Fig. 14ᴬ into the position shown in Fig. 14ᶜ. After the finger engages the lever the continued rotation of the shaft 221 tightens up the spring 239 so that pressure is applied gradually to the lever. The lever is thus positively and easily raised clear of the finger 217 which permits spring 225 to return the clutch member 220 into its normal inoperative position shown in Fig. 14ᶜ. The teeth of the clutch members 226 and 227 are beveled on their driving sides so that the sliding clutch member 220 is kicked out of clutching position as soon as the clutch element back starts toward its inoperative position.

The shaft 244 thus makes approximately one complete revolution and this single revolution of the shaft is reduced by the change speed gear train so that the work is indexed over a definite angle. In the embodiment of the invention herein illustrated where the work is shown to be a right-hand quadruple-threaded worm, the combination of gears has been set so as to rotate the worm about 90°.

During the indexing movement the pin 252 has been holding the arm 253 in the position shown in Fig. 15ᴮ and unlocked from the drum 246. The parts are so proportioned that the pin 252 will escape from the lever 250 at approximately the beginning of each revolution of the shaft 244 thus permitting the spring 251 to reset the latch 254 in bearing engagement with the periphery of the drum 246 and in position to snap in the notch 256 when it comes opposite the latch.

*Moving grinding wheel clear of work.*

By rotating the hand wheel 70 at the front of the machine in anti-clockwise direction, the swivel head tool mounting 37 is moved rearwardly until the grinding tool is free of the work and the carriage is in position to be returned to the opposite end of the machine for the next grinding stroke. This movement is possible without affecting the grinding wheel drive for the mounting is free to slide on the shaft 138.

*Returning carriage to initial position.*

The operator then shifts the lever 199 from the vertical position shown in Fig. 1ᴬ slightly toward the right which again acts upon the shaft 211 to rock the same in a clockwise direction on the shaft 200 to cause the clutch member 184 to engage with the other clutch member 181 thereby to cause the lead screw 187 to be rotated in the opposite direction from the rotation of the lead screw when the clutch member 184 was in engagement with the clutch member 198. This reverse rotation of the worm 187 will cause the carriage to move bodily from the tail stock end toward its initial position adjacent the head stock end of the machine.

The shifting of the lever 199 to the right acts through the shaft 211 to shift the rod 214 and with it the arm 215 from the positions shown in Fig. 14ᶜ toward the initial position shown in Fig. 13ᴬ. A final shifting of the lever either manually or automatically by the return movement of the carriage will cause the finger 217 to slide along the inclined underside of the trip lever 219 and to engage in the notch 218 ready to move the clutch member 220 into its clutching engagement with its member 227 on the next actuating of the indexing mechanism.

*Automatic stopping of the return movement of the carriage.*

As the carriage moves toward the left, it engages the adjustable stop 205 and acts on this stop and through the rod 203; link 209 and lever 210 to swing the clutch member 184 fully into its initial position thus intercepting the reverse rotary movement of the lead screw 187 and stopping the carriage opposite its initial grinding position.

*Refining grinding position.*

The grinding position of the tool is set usually when in engagement with the work by loosening set screw 85 and rotating the ring 82 until the desired angular rotation of the sleeve 72 is indicated opposite the zero mark 74'. The screw 75 is then moved into binding engagement with the handle. By this means the tool when moved away from the work, may be reset into its previous grinding by bringing the present mark on the scale 83 opposite the zero mark 74' and then the wheel 70 may be rotated until the zero marks on the scales coincide thus indicating to the operator that the present advance has been made by the grinding tool into the work.

*Adjusting angular position of tool.*

Should it be desired to adjust the angular position of the grinding wheel so as to fit the threads of different pitch worms, the screw 64 is loosened and by means of a wrench engaging the heads 58, the worm 56 is rotated in either direction to obtain the desired angular position of the grinding tool. This angular variation of the tool is conveniently observed by means of the scales 326 and 327 and the mounting is locked when the tool is shifted into its desired position as indicated by the scales. The screw 64 is then tightened up until the blocks 61 are in firm, binding and holding engagement with the mounting.

*Manual adjustment of work.*

Should it be desired to index the work manually or to set the work relative to the tool the nut 324 may be loosened slightly thus freeing the shaft 302 from the worm 303. By manipulating the hand wheel 319, the worm 303 may be rotated in either direction independently of the shaft. This independent rotation of the worm acts through the worm wheel 304 and spindle 305 to revolve the live center 33. When the proper rotary adjustment of the work is attained the nut 324 is tightened up against the cone 323 again locking the shaft 302 to the worm 303.

By means of a device of this character a positive drive is maintained between the main shaft 91 and the grinding tool 59 in all positions of the same while in grinding engagement with the work. During the traverse of the tool the carriage is free to slide along the shaft 108 while its rotary movement is transmitted without interruption to the grinding wheel. It is also possible to move the tool mounting 51 transversely of the length of the work and without in any way affecting the positive driving engagement with the tool. In this way it is possible to drive the tool at high rotary speed through a positively connected meshed gear construction possessing all of the advantages adherent in such a transmission.

The transmission provided by the spiral gear train 149—153 is noiseless and free of back-lash and other loose play which might injuriously affect the efficiency of the power transmission conveyed to the high speed grinding tool.

As the center of the grinding tool is set in the axis of its swinging movement about the line *a—a* and as this axis intersects the axis of the work held between the centers then the center of the grinding tool is fixed at all times in the plane containing the center axis and the grinding tool will be in proper grinding relation to the work irrespective as to the size of the worm or the angle to which the tool has been shifted to fit the angle of the worm threads.

In the device disclosed practically all of the movable parts are inclosed and protected from the grinding dust. In this way the wear on the parts is reduced to a minimum. The cooling liquid and dust dropping from the grinding tool is collected in the basin 41 and flows into the gutter 20 and is discharged out through the pipe 20'.

Having thus described my invention, I claim:—

1. In a device of the class described, the combination of a supporting structure, work supporting and revolving means carried by said structure, a power shaft mounted in said structure for rotation about a fixed axis, a grinding tool carriage mounted on said structure so as to be shifted along the length of the work to be ground, means actuated from said power shaft fixed in the structure for shifting the carriage, a grinding tool moved bodily by the shifting of said carriage and a continuance shafting and-gear drive connecting said shiftable tool with said fixed axis-power-shaft whereby a positive continuous mechanical drive is provided between the shaft and tool in all operative positions of the tool relative to the work carried by the work-supporting-and-revolving means.

2. In a device of the class described, the combination of a supporting structure, work supporting and revolving means carried by said structure, a power shaft mounted in said structure, a driving connection between said work revolving means and said power shaft, a grinding tool carriage shiftably mounted on said structure and distinct from the structure carrying the power shaft, a grinding tool moved bodily by the shifting of said carriage and a continuous shaft-and-gear-drive connecting said shiftable tool with said power shaft whereby a positive mechanical drive is provided between the shaft and tool in all operative positions of the tool relative to the work carried by the work supporting and revolving means.

3. In a device of the class described, the combination of a supporting structure, a worm supporting and revolving means carried by said structure, a power shaft mounted in said structure and operatively connected to said revolving means to turn the supported worm, a grinding tool carriage shiftably mounted on said structure, means actuated from said power shaft for advancing the tool carriage in timed relation to the turning of the worm, a grinding tool moved bodily by the shifting of said carriage into grinding relation to the threads of the worm and a gear train contained within said carriage and constituting a positive drive connecting said worm actuating power shaft with said tool.

4. In a device of the class described, the combination of a supporting structure, means for supporting and revolving a worm to be ground, a power shaft mounted in said structure, a tool carriage mounted to slide parallel to said supported worm, a tool mounting supported by said carriage and adjustable relative thereto, a control for adjusting the tool mounting relative to the tool carriage, a second shaft carried by the tool carriage and having a driving connection with the power shaft in all positions of the carriage, a tool spindle carried by the carriage and a gear train connecting said spindle with said second shaft.

5. In a device of the class described, the combination of a supporting structure, means for supporting and revolving a worm to be ground, a power shaft mounted in said structure, a tool carriage mounted to slide parallel to said shaft, a tool mounting mounted on said carriage and adjustable relative thereto, a second shaft carried by the tool carriage and having a driving connection with the power shaft in all positions of the carriage, a grinding tool carried by said spindle, a tool spindle carried by the carriage, a gear train connecting said spindle with said second shaft and means for revolving said tool mounting about the axis of said second shaft, thereby to vary the position of the grinding tool relative to the threads of the worm.

6. In a device of the class described, the combination of a supporting structure, work supporting and revolving means carried by said structure, a power shaft mounted in said structure, a tool carriage mounted to slide parallel to said shaft, a tool mounting mounted on said support and adjustable relative thereto, a second shaft carried by the tool carriage and having a driving connection with the power shaft in all positions of the carriage, a tool spindle carried by said mounting, a gear train connecting said spindle with said second shaft and means for shifting the tool mounting and spindle in a direction parallel to the axis of said second shaft.

7. In a worm grinding machine, the combination of a power shaft, a tool carriage mounted to move parallel to said shaft, a gear keyed to said shaft and slidable longitudinally thereon, a tool carrying head mounted on said support and movable transversely of the power shaft, a transmission shaft carried by the tool carriage and extending at right angles to the power shaft, a driving connection between said gear and the transmission shaft in all positions of the same, a tool driving mechanism carried by said head, said mechanism including a slidable driving connection with said transmission shaft.

8. In a worm grinding machine, the combination of a support, means for supporting and revolving the worm to be ground, a power shaft having a fixed axis of rotation, a tool carriage mounted on the support for movement parallel to the axis of rotation of the supported worm, said carriage including a tool carrying head, means for moving the carriage longitudinally of the work support and in timed relation to the turning worm, means for moving the head transversely of the work support, a tool spindle rotatably mounted in the head and shiftable therewith and a meshed gear driving connection between said fixed axis power shaft and said shiftable tool spindle.

9. In a device of the class described, the combination with a support, a work-supporting and revolving means carried by said support and a power shaft carried thereby and having a fixed axis of rotation, of a tool carriage mounted on the support, means for moving the carriage longitudinally of the work support, means for moving a tool supporting element of the carriage transversely of the work support, a tool spindle rotatably mounted in said element and shiftable therewith, a meshed gear driving connection between said fixed axis power shaft and said shiftable tool spindle, said driving connection including a transmission shaft and means for revolving the carriage about said axis of transmission shaft whereby the tool spindle may be revolved relative to the fixed-axis power shaft without affecting the driving engagement therewith.

10. In a worm grinding machine, the combination with a support, power means for supporting and revolving the worm to be ground and a power shaft carried by the support, of a tool carriage slidably mounted on the support, a tool mounting carried by the carriage and positioned for revolutionary movement about an axis, locking means engaging the tool mounting for fixing the same in adjusted position, means for moving the carriage and tool mounting longitudinally of said axis, and a tool drive including a shaft concentrically disposed relative to said axis of rotation of the adjusted tool mounting.

11. In a device of the class described, a support, power mechanism carried by the support, a tool carriage mounted on said support and including three superimposed members, the bottom member guided for longitudinal movement along said support, the intermediate member guided for movement transversely of the movement of the bottom member and a top member mounted for rotary adjustment about a horizontal axis, a tool spindle carried by said top member, a gear train carried by said top member for actuating the tool spindle in all of its adjusted positions and a constant driving connection between the power member on the support and the gear train in the top member.

12. In a device of the class described, a support, a tool carriage mounted on said support and including three superimposed members, the bottom member guided for longitudinal movement along said support, means for moving said bottom member the intermediate member guided for movement transversely of the movement of the bottom member and a top member mounted for rotary movement about a horizontal axis, a tool spindle carried by said top member, a gear train carried by said top member for actuating the tool spindle in all of its adjusted positions, means connecting the first named means with said gear train, and a grinding tool positioned in the axis of rotation of the top member and attached to said tool spindle to be rotated thereby.

13. In a device of the class described, a support, a power member carried by said support, a tool carriage mounted on said support and including three superimposed members, the bottom member guided for longitudinal movement along said support, the intermediate member guided for movement transversely of the movement of the bottom member and a top member mounted for rotary adjustment about a horizontal axis, a tool spindle carried by said top member, a gear train carried by said top member for actuating the tool spindle in all of its adjusted positions, a driving connection between the power member and said gear train, said connection including a manually actuated control for reversing the direction of rotation of said tool.

14. In a device of the class described, the combination with means for revolving a worm to be ground, a shiftable grinding tool, means operatively connected to said first named means for maintaining the tool in proper relation to the revolving worm, said last named means including a power member having a fixed axis of rotation and a gearing mechanism constituting a positive driving connection between said power shaft and said grinding tool in all grinding positions of said tool.

15. In a device of the class described, the combination with means for revolving a worm to be ground, a shiftable grinding tool, means for setting the tool in grinding engagement with the worm, means for maintaining the tool in proper relation to the revolving worm, including a power member having a fixed axis of rotation a gearing mechanism constituting a positive driving connection between said power shaft and said grinding tool in all grinding positions of said tool, and a common source of power operatively connected to said worm revolving means, and to said tool maintaining means to actuate the same in unison.

16. In a device of the class described, the combination with means for revolving a worm to be ground, a shiftable grinding tool, means for setting the tool in grinding engagement with the worm, means operatively connected with the worm revolving means for maintaining the tool in proper relation to the revolving worm a power member having a fixed axis of rotation and a gearing mechanism constituting a positive driving connection between said power shaft and said grinding tool in all grinding positions of said tool, said gearing mechanism including a multiplying gear set for revolving the tool at relatively high speed.

17. In a device of the class described, the combination of a tool swivel head mounting including a member having a cylindrical bore, a swivel head having a cylindrical portion rotatably fitted in said bore, said head including an arm overhanging the cylindrical portion and provided with a grinding tool spindle casing connecting the arm and cylindrical portion, a spindle rotatably mounted in said casing, and a driving mechanism mounted within the overhanging arm for revolving said tool spindle.

18. In a device of the class described, the combination of a tool swivel head mounting including a member having a cylindrical bore, a swivel head having a cylindrical portion rotatably fitted in said bore, a manually actuated member and means between said member and said head for revolving the head into set position relative to the mounting.

19. In a device of the class described, the combination of a tool swivel head mounting including a member having a cylindrical bore, a swivel head having a cylindrical portion rotatably fitted in said bore, a manually actuated member, and a worm and gear connection between said member and said head for revolving the head into set position relative to the mounting.

20. In a device of the class described, the combination of a support, a carriage including a bottom saddle movable longitudinally of said support, a tool head mounting supported by said saddle and movable therewith, means for moving the mounting transversely of the support, a swivel head rotatably supported in said mounting for movement about a horizontal axis, a grinding tool carried by said swivel head and power means for rotating the grinding tool and for moving the saddle.

21. In a worm grinding machine, the combination of a supporting frame, means for supporting the worm to be ground in said frame and for revolving the same, a power shaft carried by said frame, a grinding tool, means for maintaining the tool in proper grinding relation to the threads of the revolving worm, said means including a carriage movable longitudinally along said frame, a saddle carried by said carriage and mounted to move transversely of the direction of movement of the saddle, a spindle for the grinding tool carried by said saddle, a driving connection between said shaft carried by the frame and the spindle carried by the saddle, a manually actuated hand wheel rotatably mounted on said carriage and accessible from the front of the machine and a lead screw connection between said hand wheel and said saddle to move the tool to and from the work.

22. In a worm grinding machine, the combination of a supporting frame, means for supporting the worm to be ground in said frame and for revolving the same, a power shaft carried by said frame, a tool carriage movable by said carriage and mounted to move transversely of the direction of movement of the carriage, a grinding tool carried by said saddle, a driving connection between said shaft and said movable tool, a manually actuated hand wheel rotatably mounted on said carriage and accessible from the front of the machine, a lead screw connection between said hand wheel and said saddle to move the tool to and from the work, and a micrometer feeding dial operatively connected to said hand wheel.

23. In a device of the class described, the combination of a supporting frame, means carried by said frame for revolving the work, a power shaft carried by said frame, a grinding tool, means for maintaining the tool in proper grinding relation to the revolving work, a tool carriage movable longitudinally along said frame, a saddle constituting an element of said carriage and mounted to move transversely of the direction of movement of the carriage, a tool spindle movable with said saddle, a driving connection between said shaft and spindle, a manually actuated hand wheel rotatably mounted on said carriage, a lead screw connection, said hand wheel and said saddle to move the tool to and from the work, a micrometer feeding dial operatively connected to said hand wheel and means for locking said dial in position.

24. In a worm grinding machine, the combination with means for supporting and rotating the worm to be ground, a grinding tool, means for revolving the tool at relatively high speed, manually actuated means for advancing the tool into grinding engagement with the worm and indicating means carried by said advancing means and adapted to be preset to indicate the desired advance of the tool into the worm.

25. In a device of the class described, the combination of a supporting frame, a worm revolving and supporting means, means for maintaining the grinding tool in proper grinding relation to the threads of the worm, said means including a tool carriage mounted on said frame and guided for movement parallel to the axis of rotation of the supported worm, a lead screw revolubly mounted in said frame and operatively connected to said carriage to advance the same along the frame, a main power shaft, a worm shaft driven thereby and a manually controlled clutch connection between said worm shaft and said lead screw.

26. In a device of the class described, the combination of a supporting frame, work revolving and supporting means, a tool carriage mounted on said frame and guided for movement parallel to the axis of rotation of the supported work, a lead screw revolubly mounted in said frame and operatively connected to said carriage to advance the same along the frame, a main power shaft, a worm shaft driven thereby, a manually controlled clutch connection between said worm shaft and said lead screw and means controlled by the position of the carriage for moving the clutch connection automatically into an inoperative position whereby the driving connection between the power shaft and the lead screw may be intercepted either manually, or automatically by the movement of the carriage into a preset position.

27. In a machine for grinding worms, the combination with means for revolving the worm to be ground, a grinding tool and means for maintaining the tool in proper grinding contact with the teeth of the worm, said means including a tool supporting carriage, means for advancing the carriage relative to the worm, a clutch for controlling said advancing means, a clutch controlling rod, a stop adjustably positioned on said rod and disposed in the path of movement of the carriage whereby the fixed movement of the carriage will act through the rod to move the clutch into inoperative position.

28. In a device of the class described, the combination of a clutch element designed to be continuously rotating, an indexing mechanism including a main driving shaft provided with a coacting clutch element keyed thereto, a tripping mechanism supporting shaft, a yoke loose on said supporting shaft and connected to said coacting clutch element to move the same into clutching engagement with said continuously rotating clutch element, a tripping lever fixed to said yoke, a finger fixed to said supporting shaft and engaging said lever whereby the rocking of the supporting shaft in one direction will shift the coacting clutch element in clutching position, means carried by the indexing shaft and engaging the tripping lever to disconnect the clutch element from the supporting shaft after the indexing shaft has made one revolution and means engaging the coacting clutch element for moving the same into an inoperative position.

29. In a device of the class described, the combination of a clutch element designed to be continuously rotating, an indexing mechanism including a main driving shaft provided with a coacting clutch element keyed thereto, a tripping mechanism supporting shaft, a yoke loose on said supporting shaft and connected to said coacting clutch element to move the same into clutching engagement with said continuously rotating clutch element, a tripping lever to disconnect the clutch element from the supporting shaft after the indexing shaft has made one revolution, means engaging the coacting clutch element for moving the same into an inoperative position, a control rod for rocking said supporting shaft and manually actuated means for actuating said control rod.

30. In a device of the class described, an indexing mechanism including a main shaft, a clutch element keyed to said shaft, means for sliding the element along said shaft into an operative position, a manually actuated control member, a latch connecting said sliding means with said control member, a latch tripping device loose on said shaft and having a finger designed to be rotated into engagement with said latch to move the same into an inoperative position and a spring coiled about the shaft with one end fixed thereto and the other end fixed to said tripping device.

31. In a device of the class described, the combination of a supporting frame including a longitudinally extending partition, means for supporting and rotating a worm to be ground, a tool supporting carriage, means for moving the same longitudinally, a grinding tool carried by said carriage, an open top oil receiving gutter supported by said partition below said carriage and disposed to receive the oil drip from said grinding tool in all positions of the same.

32. In a device of the class described, the combination of a supporting frame, means for supporting and rotating a worm to be ground, a tool carriage movable on said frame, means for moving the carriage, a grinding tool carried by the carriage, said carriage provided with an oil drip opening positioned below the tool, and an open top gutter carried by the frame and positioned to receive the oil drip discharged from the tool through said opening in the carriage in all positions of the same relative to the frame.

33. In a worm grinding machine, the combination with a grinding mechanism for grinding the threads of the worm and including a main driving shaft, an expansible inner ring fastened to said shaft and provided with a pair of spaced apart expanding arms, a power pulley loosely encircling said ring, an expanding spool loose on said shaft and means for sliding the spool into position between said arms to separate the same and thus expand the ring into clutching engagement with said pulley.

34. In a device of the class described, the combination of a grinding mechanism including a main driving shaft, an expansible ring keyed to said shaft and provided with a pair of expanding arms positioned on opposite sides of the shaft, each of said arms provided with set screws facing the shaft, a driving pulley for turning said ring and shaft, an expanding spool for engaging the screws thereby to expand the ring into clutching engagement with said pulley and manually controlled means for moving said spool into and out of actuating engagement with said expansible ring.

35. In a device of the class described, the combination of a grinding mechanism including a main driving shaft, an expansible ring keyed to said shaft and provided with a pair of expanding arms positioned on opposite sides of the shaft, each of said arms provided with set screws facing the shaft, a driving pulley for turning said ring and shaft, an expanding spool for engaging the screws thereby to expand the ring into clutching engagement with said pulley, a manually actuated clutch controlling shaft, an actuating lever fixed to said controlling shaft and a yoke and groove connection between said controlling shaft and said sleeve whereby the actuation of said lever will cause said pulley to be connected with and disconnected from its driving engagement with said main shaft.

Signed at New York, in the county of New York, and State of New York, this 28th day of May, A. D. 1918.

DAVID FITZPATRICK.